US010676915B2

(12) United States Patent
Gibbons

(10) Patent No.: US 10,676,915 B2
(45) Date of Patent: Jun. 9, 2020

(54) SYSTEM AND METHODS FOR THE PRESERVATION OF MECHANICAL ASSETS

(71) Applicant: Michael P. Gibbons, Western Springs, IL (US)

(72) Inventor: Michael P. Gibbons, Western Springs, IL (US)

( * ) Notice: Subject to any disclaimer, the term of this patent is extended or adjusted under 35 U.S.C. 154(b) by 140 days.

(21) Appl. No.: 15/867,231

(22) Filed: Jan. 10, 2018

(65) Prior Publication Data

US 2018/0127972 A1  May 10, 2018

Related U.S. Application Data

(63) Continuation of application No. 14/293,390, filed on Jun. 2, 2014, now Pat. No. 9,869,083, which is a continuation of application No. 12/587,510, filed on Oct. 8, 2009, now Pat. No. 8,740,099.

(60) Provisional application No. 61/195,526, filed on Oct. 8, 2008.

(51) Int. Cl.
| | |
|---|---|
| *E04B 1/343* | (2006.01) |
| *E04H 5/02* | (2006.01) |
| *G05D 27/02* | (2006.01) |
| *E04H 6/08* | (2006.01) |
| *E04H 6/44* | (2006.01) |
| *E04H 15/02* | (2006.01) |

(52) U.S. Cl.
CPC .............. *E04B 1/343* (2013.01); *E04H 5/02* (2013.01); *E04H 6/08* (2013.01); *E04H 6/44* (2013.01); *G05D 27/02* (2013.01); *E04B 2001/34394* (2013.01); *E04H 15/02* (2013.01)

(58) Field of Classification Search
CPC ........... F25D 2317/04; F25D 2317/041; F25D 2317/0415; F25D 2317/0416; E04B 1/343; E04B 2001/34394; E04H 5/02; E04H 6/08; E04H 6/44; E04H 15/02; G05D 27/02
See application file for complete search history.

(56) References Cited

U.S. PATENT DOCUMENTS

| | | | |
|---|---|---|---|
| 1,870,070 A | 8/1932 | Rugg | |
| 2,751,197 A | * 6/1956 | Herrman | ................. F25D 21/14 |
| | | | 165/230 |
| 4,188,985 A | 2/1980 | Osterman | |
| 4,205,749 A | 6/1980 | Carrol et al. | |
| 4,284,173 A | 8/1981 | Patterson | |
| 4,523,692 A | 6/1985 | Lemkin | |
| 4,639,031 A | 1/1987 | Truckenbrodt | |
| 4,779,391 A | 10/1988 | Taylor | |
| 4,823,955 A | 4/1989 | Apps | |
| 4,934,255 A | 6/1990 | McDonnell et al. | |
| 5,054,295 A | 10/1991 | Goulooze | |

(Continued)

*Primary Examiner* — Marc E Norman
(74) *Attorney, Agent, or Firm* — Valauskas Corder LLC

(57) ABSTRACT

A system and methods for the storage, and preservation of mechanical assets, including collectable automobiles, small airplanes and watercraft in a storage unit. The storage unit includes a plurality of asset modules. The volume of each asset module is variable. The atmosphere of each asset module may be controlled by a control system. Control of the atmosphere of each asset module includes control of parameters including the type of gas each atmosphere is composed of and the temperature, the pressure and relative humidity of each atmosphere. These parameters may be monitored and controlled from a remote location.

20 Claims, 19 Drawing Sheets

(56) References Cited

U.S. PATENT DOCUMENTS

| | | | |
|---|---|---|---|
| 5,060,816 A | 10/1991 | Robbins, III | |
| 5,259,553 A | 11/1993 | Shyu | |
| 5,309,686 A | 5/1994 | Underwood et al. | |
| 5,547,421 A | 8/1996 | Scheetz | |
| 5,572,759 A | 11/1996 | Zachhuber | |
| 5,724,779 A | 3/1998 | Chang | |
| 5,799,495 A | 9/1998 | Gast, Jr. et al. | |
| 5,810,245 A | 9/1998 | Heitman et al. | |
| 5,832,676 A | 11/1998 | Gillmore et al. | |
| 6,067,762 A | 5/2000 | Greer et al. | |
| 9,739,048 B2 | 8/2017 | Cueto et al. | |
| 2003/0034390 A1* | 2/2003 | Linton | G06Q 10/08 235/382 |
| 2004/0216395 A1 | 11/2004 | Wentworth, Jr. | |
| 2004/0255858 A1 | 12/2004 | Lee | |
| 2005/0193643 A1 | 9/2005 | Pettus | |
| 2005/0279035 A1 | 12/2005 | Donovan | |
| 2006/0086126 A1* | 4/2006 | Montuoro | F25D 11/02 62/329 |
| 2007/0182114 A1 | 8/2007 | Fernandes et al. | |
| 2008/0030043 A1 | 2/2008 | Camps | |
| 2009/0266095 A1* | 10/2009 | Pruneri | A23L 3/3418 62/231 |
| 2010/0192463 A9 | 8/2010 | Stewart | |
| 2010/0269525 A1* | 10/2010 | Wang | A23B 7/148 62/179 |
| 2015/0008218 A1 | 1/2015 | Lupul et al. | |

\* cited by examiner

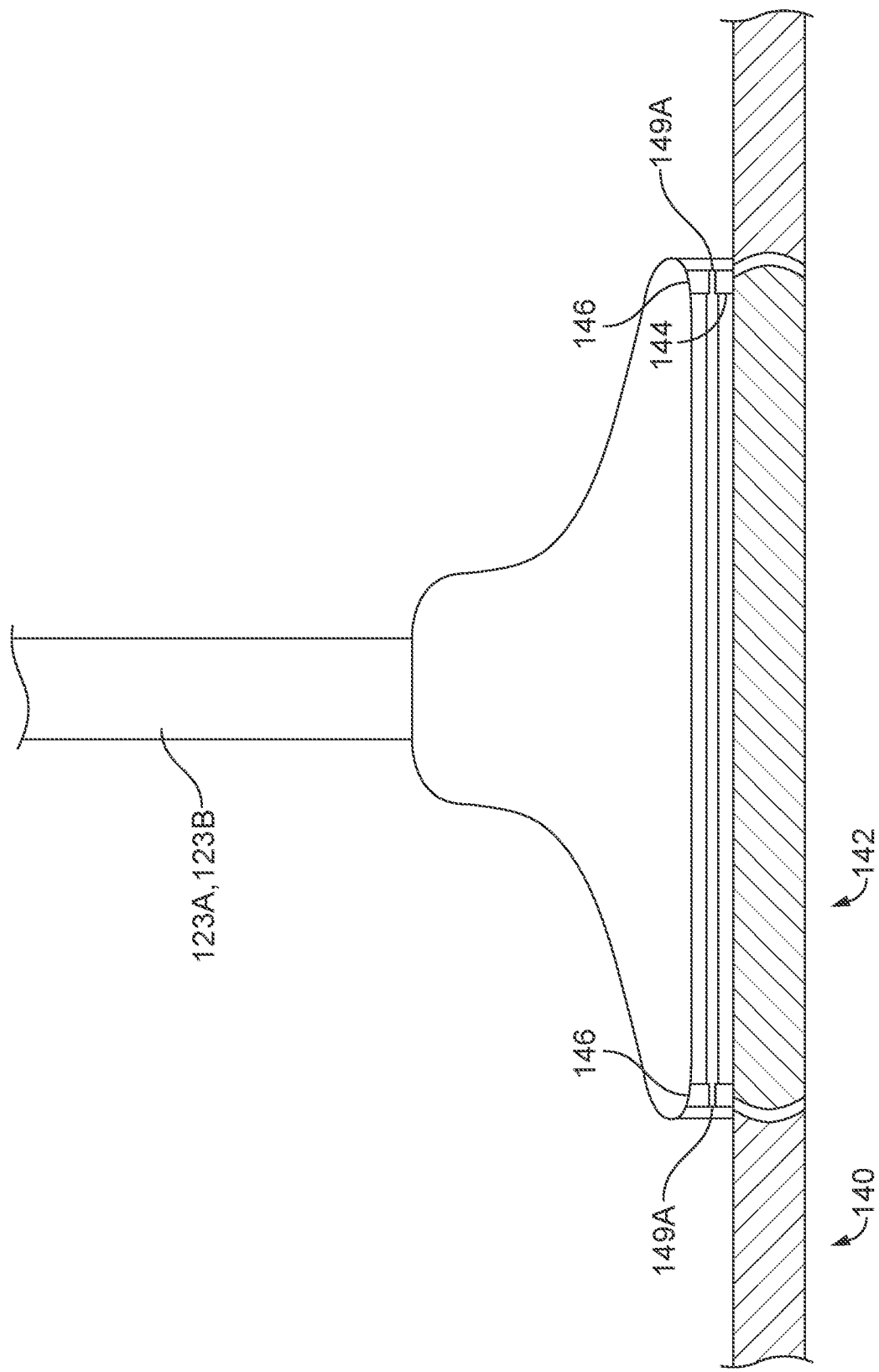

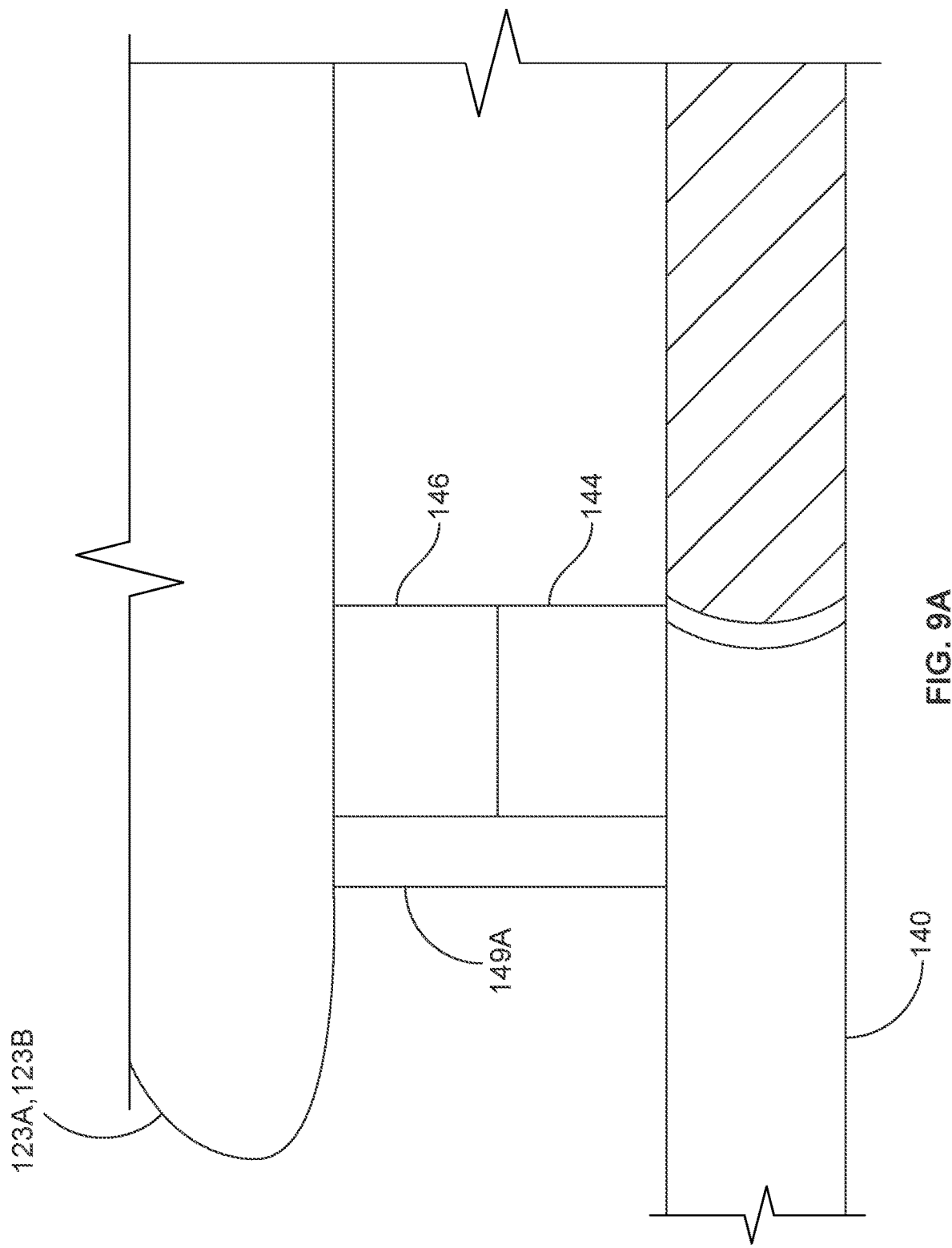

SYSTEM AND METHODS FOR THE PRESERVATION OF MECHANICAL ASSETS

CROSS-REFERENCE TO RELATED APPLICATIONS

This application is a continuation of U.S. application Ser. No. 14/293,390 filed Jun. 2, 2014 which claims the benefit of Ser. No. 12/587,510 filed Oct. 8, 2009 which claims the benefit of U.S. provisional application No. 61/195,526 filed Oct. 8, 2008, which are incorporated by reference in their entirety.

FIELD OF THE INVENTION

The present invention relates generally to a system and method for the preservation of mechanical assets. In particular, the present invention relates to a system including and methods using one or more preservation modules to facilitate such preservation.

BACKGROUND

Mechanical assets are acquired and retained for different reasons and for varying periods of time. For purposes of this application, the term "mechanical asset" or "asset" means an item of personal property that may be purely mechanical but that may be electromechanical, analog, or digital and/or may include electromechanical, analog, and/or digital components. Mechanical assets may be large in size—such as automobiles, airplanes, construction equipment, engines, spacecraft, tanks and other military equipment, tractors, locomotives or other train cars, and watercraft—or the components for same—such as engines, drive trains and seats. For purposes of this application, mechanical assets may be also relatively smaller in size—such as computer systems and components thereof, furniture, and tools. Mechanical assets are acquired at least initially for their utility in helping to perform a task including acting as a mode of transportation or facilitating construction or repair jobs.

All mechanical assets must be maintained in order that they can continue to operate as originally intended. The amount of maintenance that is needed to keep a mechanical asset in working order varies from asset to asset. However, generally the more the mechanical asset must be used for the original intended utilitarian purpose, the more maintenance is required. Mechanical assets also with more sensitive or complex components and subsystems generally require more maintenance than assets formed from one or more components or that include more durable or simplified subsystems. With time, the maintenance of mechanical assets in general working order becomes more and more challenging. Replacement components of such mechanical assets that may have been widely available—become with time scarce and more difficult to obtain. Salvaging such components from other mechanical assets is often the only way to maintain other mechanical assets. Unless steps are taken to preserve the asset, exposure to environmental conditions—such as the fluctuations in climate, moisture, salt or minerals from the ocean or a sea, and the sun—will cause the condition of the asset to degrade. If left unchecked, the degradation of the asset may in certain cases quickly place the asset in a non-working condition and limit its utilitarian value and value to collectors.

One simple known step taken to preserve a mechanical asset is to shield the asset from complete exposure to environmental conditions. Many systems, products, and methods are known by which a mechanical asset can be shielded in order to preserve the asset. Such shielding can be accomplished simply by positioning the asset under an extension of a building—including, such as under what is known in residential settings as a "car port". Such a shield protects the asset from at least direct exposure to the sun and precipitation. The shielding of an asset can be accomplished also through the use also of tarpaulins—"tarps"—and other covers. These shields are flexible pieces of material that are at least large enough to fit over and come into contact with the asset to prevent it from being exposed to the sun and to precipitation. Forms of shields include shades or screens—that are placed by or in general contact with the windows of those assets having them—to block sunlight from entering the windowed areas, thereby shielding at least some of the asset from sun damage and the increased temperatures that sunlight causes within the closed spaces defined at least in part by the windows. Protective coatings applied to the upper surface and the under body of assets are used also to shield the components of the asset from direct contact with the environmental elements such as sun, precipitation, and moisture. Liquid components within assets are also shielded from the damage caused by unprotected exposure to the elements through the addition of stabilizing agents to the fluid.

It is clear that such shields are not complete solutions to the problem in that, for the most part, they protect only a portion or limited components of the complete asset from the environmental conditions. For example, car ports typically prevent an asset from being exposed to the direct rays of the sun when overhead or from precipitation falling generally vertically. However, car ports do not protect assets from sun damage caused by the sun when it is not overhead or when it is reflected. Also, car ports do not protect assets from wind blown rain and snow or from the variations in ambient temperature and moisture and wind. More immediate coverings—such as tarpaulins—prevent the asset from being directly exposed to the sun or precipitation but do not prevent the asset from suffering damage due to fluctuations in environmental temperature or moisture conditions. Protective coatings prevent exposure of some but not all the components of the mechanical asset.

More complete solutions that are intended to shield, and thereby preserve mechanical assets are storage facilities. Such storage facilities include those that are a room for storage of a mechanical asset that forms a part of another building that is not intended primarily for such storage. An attached garage is such a facility for the storage of a mechanical asset and is a room within a larger building that is intended as a residence. Another such storage facility is a stand alone building that is used largely solely for the storage of a mechanical asset. For example, such stand alone buildings include a free standing garage, a hanger, or a barn. Another such storage facility is an enclosure within a larger enclosure and to which access may be separately provided. Such a storage facility is commonly known as a storage locker or storage unit.

Most typically, more complete storage facilities are sited to allow easy ingress to and egress of the mechanical asset stored therein. For example, garages are sited so that the cars can be readily driven into and out of the garage and on to the street. Hangers are positioned so that planes can be pulled into and out of the facility after landing or for take off. Barns are located on farms so that the farm equipment such as tractors, combines, or trucks can be readily driven in and out of the facility as needed. Storage lockers or units are positioned in proximity to streets so that patrons can load equipment into or remove equipment out of the lockers or units.

These known storage facilities—because they are formed by walls joined to define a given interior volume of space—do typically shield assets from direct exposure to the sun, wind, precipitation, and the unprotected extremes of the temperature of the outside environment. However, because known storage facilities are formed from fixed walls joined together to form the interior volume, they cannot be resized on demand to efficiently accommodate assets of different sizes and shapes. Furthermore, such storage facilities typically do not allow the environmental conditions within the facilities to be controlled and, for example, altered to prevent more particularized types of degradation of the asset stored therein. For example, known storage facilities do not include systems by which the atmosphere may be selectively filtered to reduce or remove harmful components thereof—such as moisture, salt, or dirt—or to replace some of the components found typically therein with other components that facilitate the preservation of the asset—such as a noble gas—by the creation of a relatively inert environment.

For the above reasons, there is a need for a system and methods by which mechanical assets can be efficiently preserved for extended periods of time. The present invention satisfies this demand.

SUMMARY OF THE INVENTION

The present invention is directed to a novel system and methods by which one or more mechanical assets can be preserved. One embodiment of the system of the present invention includes one or more asset modules. For purposes of this application, an asset module includes volume definition elements by which at least the size and shape of the interior space within the module—termed for purposes of this application the "module volume"—may be efficiently defined as needed such as to accommodate the storage and facilitate the maintenance of mechanical assets of varying size. Certain embodiments of the present invention include a plurality of asset modules. Embodiments of the present invention include also asset modules positioned or nested one inside another.

More specifically, a volume definition element includes a substantially continuous module surface and at least one module surface transfer component. The volume definition element facilitates resizing of the asset module on demand on both a horizontal and vertical plane, thereby permitting each module to be sized so that mechanical assets of varying sizes and shapes can be accommodated within the asset module.

The substantially continuous module surface defines a module inner volume and a protective barrier around the asset module's contents. This barrier prevents exposure of the module inner volume to exterior environmental conditions, contaminants, and non-permitted access by and thereby the possible damage that could be done by people and animals.

The module surface transfer component is a transfer section of the substantially continuous module surface through the movement of which ingress and egress to and from the inner module volume is gained. An embodiment of the module surface transfer component includes elements by which the module surface transfer component may be moved. Movement of the module surface transfer component exposes an aperture through which access to the module inner volume. Other embodiments of the module surface transfer component include elements by which the module surface component may be also removed temporarily or permanently. If the module surface transfer component is removed permanently, certain embodiments of the invention permit the transfer component to be replaced thereby.

The module surface transfer component fills the aperture in the substantially continuous module surface that was created by the movement of the module surface transfer component to and allows mechanical assets, people, and other items to enter and exit the asset module. The module surface transfer component permits the asset module to be placed in at least two states. In the first state, the module surface transfer component covers the aperture in the substantially continuous surface that was created by the movement of the module surface transfer component. In the first state, ingress/egress to and from the asset module is not facilitated. In the second state, the aperture in the substantially continuous surface that was created by the movement of the module surface transfer component is not covered. In the second state, ingress/egress to and from the asset module is possible.

The ability to change the states of the ingress/egress control element may be enabled and disabled through use of an authentication element. By enabling and disabling the ability to change the state of the ingress/egress control element, access to the inner volume of the asset module can be controlled and limited. The authentication element may employ a human screener, lock and key, pin pad, magnetic ID (Identification), RFID (Radio Frequency Identification), biometric, or any other authentication method known to one skilled in the art.

Embodiments of the asset module include preservation controls that permit the condition of the mechanical asset placed within the asset module to be monitored, maintained, and/or manipulated, thereby facilitating the preservation of the mechanical asset. Embodiments of the preservation controls are configured to be manipulated locally within the module or generally immediately outside the module, or distant from the module, such as through the use of one or more communication systems including the internet, phone line, cellular phone, pager, satellite, radio, or any other method known to one skilled in the art. Additional embodiments of the preservation controls include a computer system which permits the condition of the mechanical asset stored within an asset module to be automatically controlled.

Further embodiments include a closed system for controlling atmospheric conditions of a plurality of asset modules. An atmospheric control unit is capable of regulating, and thereby producing a controlled atmosphere within each asset module of the plurality of asset modules. The controlled atmosphere of each asset module of the plurality of asset modules may be defined by controlled atmospheric parameters. In certain embodiments, an atmosphere control unit permits one or more of each of the plurality of asset modules to provide a supplied gas having supplied gas parameters. The controlled atmospheric parameters may include a controlled atmospheric temperature, a controlled atmospheric pressure, a controlled atmospheric relative humidity, and a controlled atmospheric molecular composition. The supplied gas parameters may include a supplied gas temperature, a supplied gas pressure, a supplied gas relative humidity and a supplied gas molecular composition. The plurality of asset modules may include a selected asset module. The selected asset module may contain a selected controlled atmosphere. The selected controlled atmosphere may be defined by selected controlled atmospheric parameters. The selected controlled atmosphere may be capable of containing a selected supplied gas having selected supplied gas parameters. The selected controlled atmospheric parameters may include a selected controlled atmospheric temperature, a selected controlled atmospheric pressure, a selected controlled atmospheric relative humidity and a selected controlled atmospheric molecular composition. The selected supplied gas parameters may include a selected supplied gas temperature, a selected supplied gas pressure, a selected supplied gas relative humidity and a selected supplied gas molecular composition. The atmospheric control unit may be capable of controlling the selected supplied gas parameters to allow the selected supplied gas to be supplied to the selected asset module. The selected supplied gas may be supplied from a plurality of tanks connected to a tank control valve. The tank control valve may be capable of being controlled by the atmospheric control unit. The tank control valve may be capable of supplying the selected supplied gas with the selected supplied gas molecular composition. The tank control valve may be connected to a heat exchanger. The heat exchanger may be capable of being controlled by the atmospheric control unit. The heat exchanger may be capable of supplying the selected supplied gas with selected supplied gas temperature. The heat exchanger may be connected to an output of a humidifier. The output of the humidifier may be capable of being controlled by the atmospheric control unit. The output of the humidifier may be capable of supplying the selected supplied gas with selected relative humidity. The output of the humidifier may be connected to a pressure supply valve. The pressure supply valve may be capable of being controlled by the atmospheric control unit. The pressure supply valve may be capable of controlling the selected supplied gas pressure. The pressure supply valve may be capable of supplying the selected supplied gas with said selected supplied gas pressure. The pressure supply valve may be connected to a common supply header. The common supply header may be capable of containing the selected supplied gas composed of the selected supplied gas temperature, the selected supplied gas pressure, the selected supplied gas relative humidity and the selected supplied gas molecular composition. The atmospheric control unit may be capable of controlling a flow of the selected supplied gas contained in the common supply header to the selected asset module. The atmospheric control unit may control flow of the selected supplied gas contained in the common supply header to the selected asset module through a flexible supply component into the selected asset module. The atmospheric control unit may be capable of monitoring the selected controlled atmospheric parameters, the atmospheric control unit controls the flow of the supplied gas contained in the common supply header until the selected controlled atmospheric parameters correspond to the selected supplied gas parameters.

These and other features, aspects, and advantages of the present invention will become better understood with regard to the following description, appended claims, and accompanying drawings.

DRAWINGS

FIG. 9 is a detail view of a portion of FIGS. 7 and 8.

FIG. 9A is a detail view of a portion of FIG. 9.

DETAILED DESCRIPTION

Figure 1:
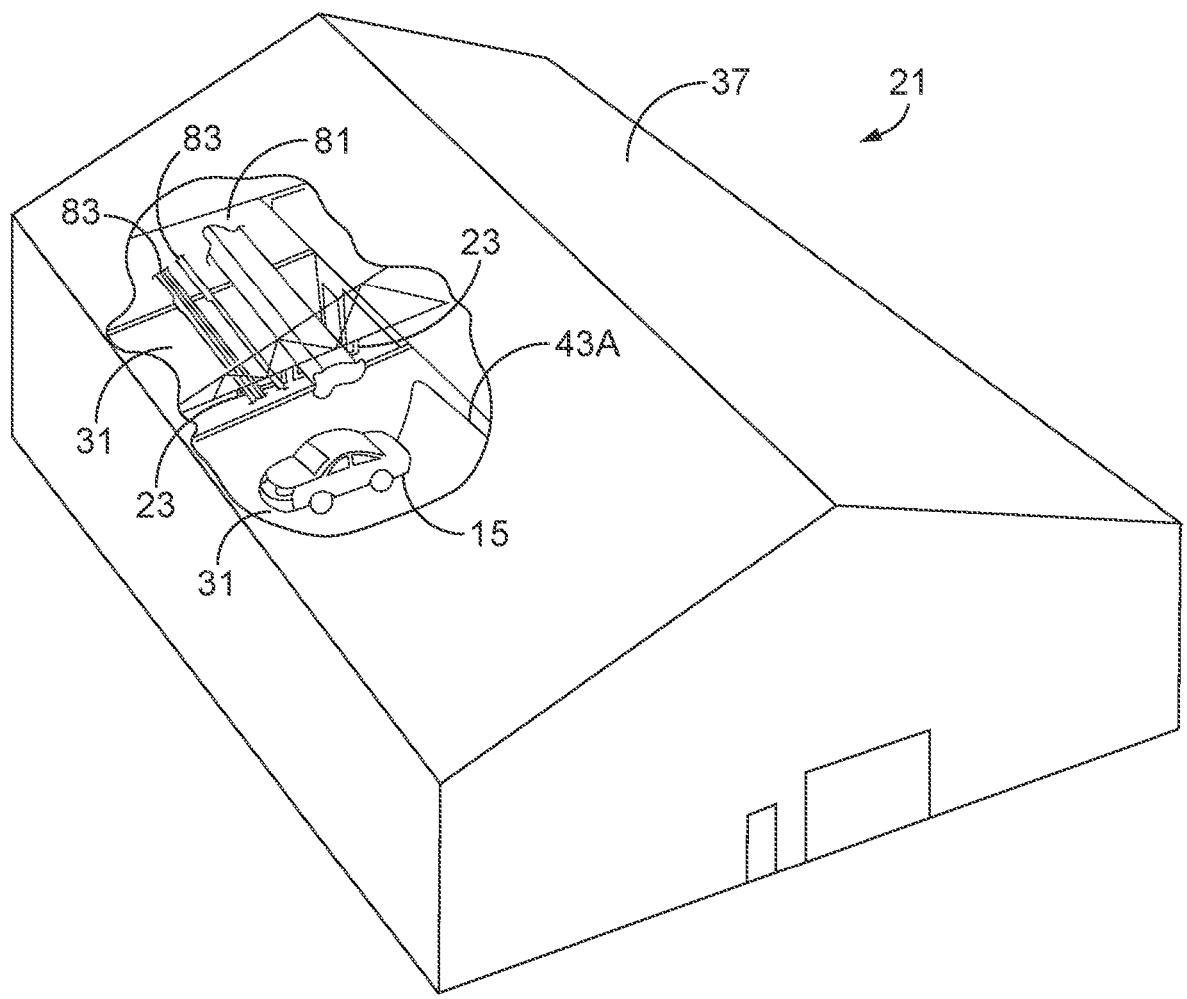
FIG. 1 shows a perspective view of an embodiment of the exterior of the outer asset module of the system, a section of the outer asset module is cut away.

The present invention is directed to a system 21 and methods for storing, maintaining and preserving one or more mechanical assets 15. In the accompanying illustrations, the system 21 is shown with reference to an automobile. However, the system 21 advantageously may be used to preserve a wide variety of assets 15 including but not limited to one or more automobiles, airplanes, bicycles, construction equipment, engines, spacecraft, tanks, tractors, trains, and watercraft. Certain preferred embodiments of the system 21 include one or more asset modules 31 contained within a single outer asset module 37. FIG. 1 illustrates an exterior of the single outer asset module 37 with a portion of the exterior of the outer asset module 37 cut-away to expose an interior of the outer asset module 37.

Figure 2:
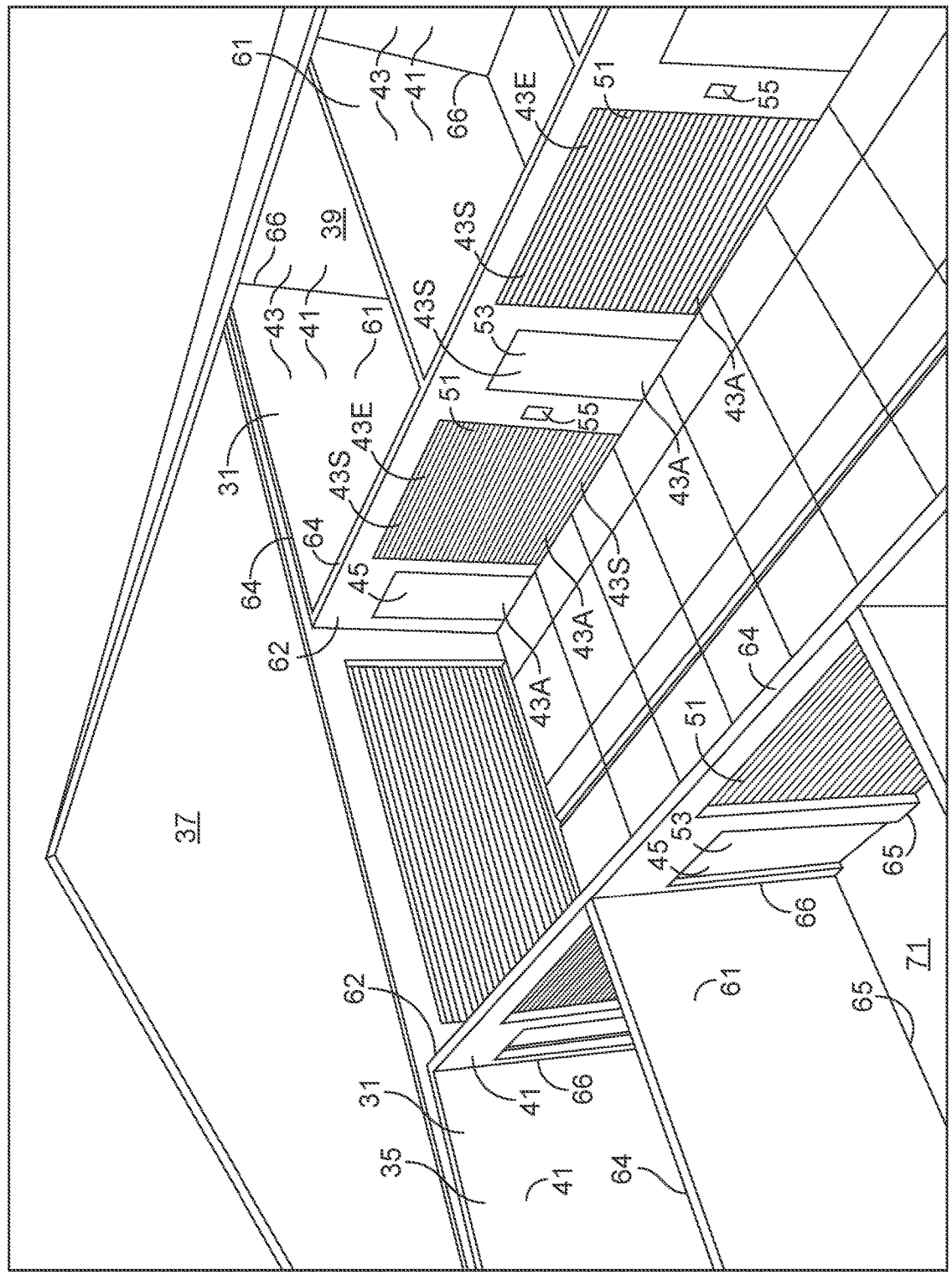
FIG. 2 shows a perspective view of an embodiment of the system, a section of the outer asset module is cut away.

As illustrated in FIG. 2, embodiments of asset modules 31 include volume definition elements 41 by which at least the module volume 35 may be efficiently defined as needed such as to accommodate the storage, and facilitate the maintenance of one or more mechanical assets 15 such as those of varying size.

More specifically, the volume definition element 41 includes a substantially continuous module surface 43 and at least one module surface transfer component 45. The volume definition element 41 facilitates resizing of the asset module 31 on demand relative to a horizontal and/or vertical plane, thereby permitting each module 31 to be sized so that one or more mechanical assets 15 of varying sizes and shapes can be accommodated within the asset module 31.

The substantially continuous module surface 43 defines the module volume 35, and forms a protective barrier relative to the asset module's contents. This protective barrier provides protection from exterior environmental conditions, contaminants, and non-permitted access by and thereby possible damage that could be done by people and animals.

As further illustrated in FIG. 2, embodiments of the module surface transfer component 45 permit the development of an aperture 43A by movement or removal of a section 43S of the substantially continuous module surface 43 in order to facilitate ingress and egress to and from the asset module 31. In embodiments of the section 43S of the substantially continuous module surface 43 that are permanently removable, an ingress/egress control element 43E may be used. Control element 43E can be of a size that varies according to the size of the section 43S moved or removed such as the sections 43S shown by the numbers 51 and 53 in FIG. 2. The optional ingress/egress control elements 51 and 53 can be sized and shaped to fill the aperture 43A in the substantially continuous module surface 43 and used to selectively expose the inner volume to external environmental conditions and allow mechanical assets, people, and other items to enter and exit the asset module 31. Embodiments of the ingress/egress control element 51 and 53 can have at least two states. In the first state, the ingress/egress control element 51 and 53 covers the aperture 43A in the substantially continuous module surface 43. In the first state, ingress/egress to and from the asset module 31 is not facilitated. In the second state, the aperture 43A in the substantially continuous module surface 43 that was created by the aperture 43A is not covered; in the second state ingress/egress to and from the asset module 31 is facilitated.

The ability to change the states of the ingress/egress control element 51 and 53 may be enabled and disabled by an authentication element 55. By enabling and disabling the ability to change and otherwise control the state of the ingress/egress control element 51 and 53, access to the inside of the asset module 31 can be controlled. The authentication element 55 may employ a human screener, lock and key, pin pad, magnetic ID (Identification), RFID ("Radio Frequency Identification"), biometric, or any other authentication method known to one skilled in the art.

As further illustrated in FIG. 2, in one preferred embodiment of the system 21, a plurality of asset modules 31 are contained within the single outer asset module 37. Each of the asset modules 31 of this embodiment is comprised of a plurality of longitudinal vertical bounding elements 61, transverse vertical bounding elements 62, and a horizontal bounding element 71, or foundation 71. An outboard vertical bounding element 39 may be configured as a portion of the single outer asset module 37, or the outboard vertical bounding element 39 may alternatively be a transverse vertical bounding element 62. Embodiments of the vertical bounding elements 61, 62 may be each comprised of a top edge 64, a bottom edge 65, and side edges 66. The side edges 66 of each of the vertical bounding elements 61, 62 may be positioned proximal to the side edges 66 of vertical bounding elements 62, thereby creating a continuous perimeter of vertical bounding elements 61, 62. The bottom edges 65 of the vertical bounding elements 61 are fixed to a horizontal bounding element 71 or another ground anchoring portion of the system.

One preferred embodiment of the system 21, includes a plurality of apertures 43A in the substantially continuous surface 43. An ingress/egress control element 51 and 53 may be inserted in each of the apertures 43A. The first ingress/egress control 51 is constructed of a size and shape to allow the ingress and egress of the stored mechanical asset 15 but may be used for the ingress and egress of any person or item that fits. The second ingress/egress control 53 is constructed of a size and shape to allow the ingress and egress of people but may be used for the ingress and egress of any item that fits. Each ingress/egress control 51 and 53 may include an authentication element 55.

Figure 3:
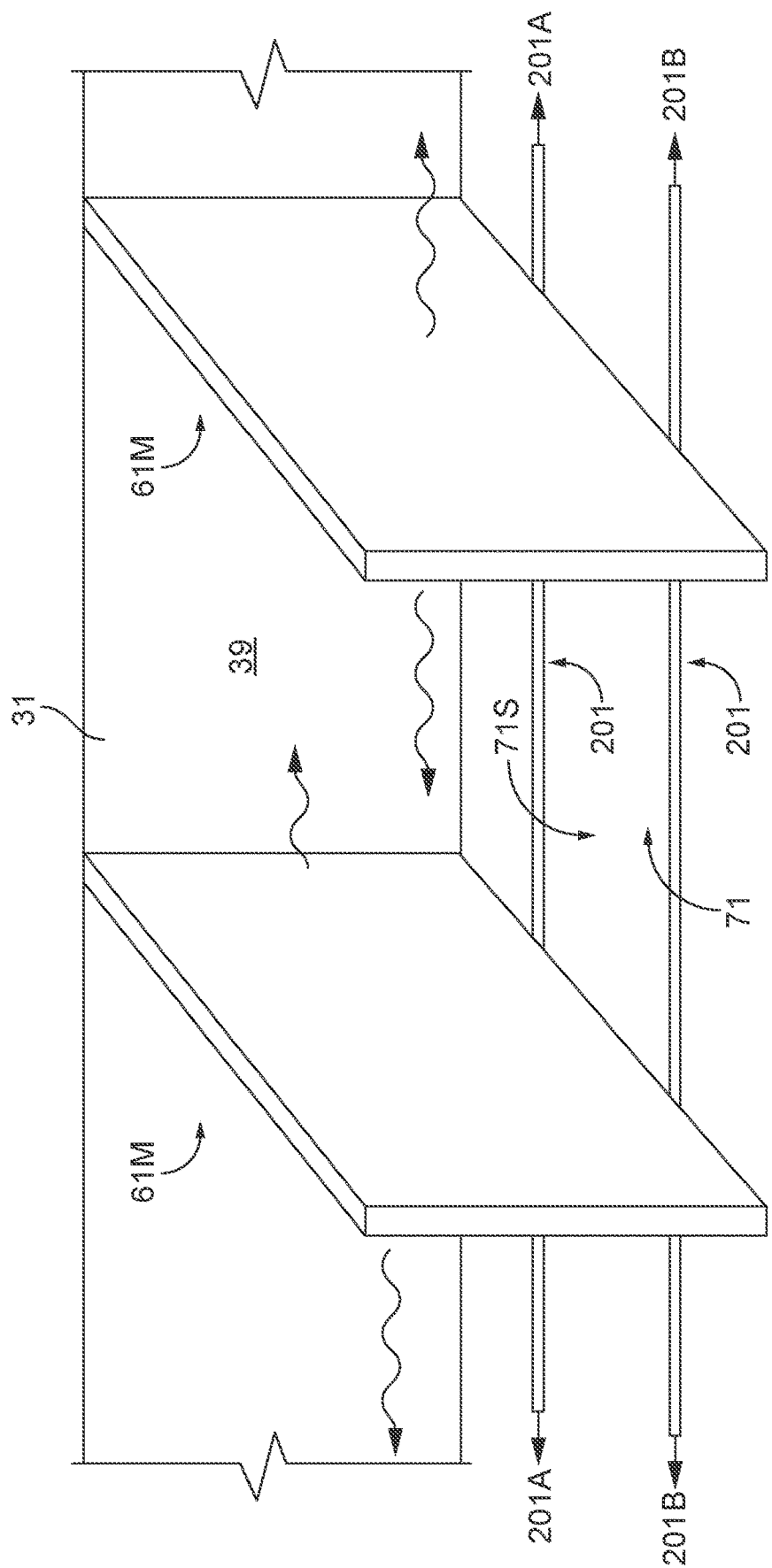
FIG. 3 shows an asset module whose inner volume is definable, in part, by movable vertical bounding elements.
Figure 3A:
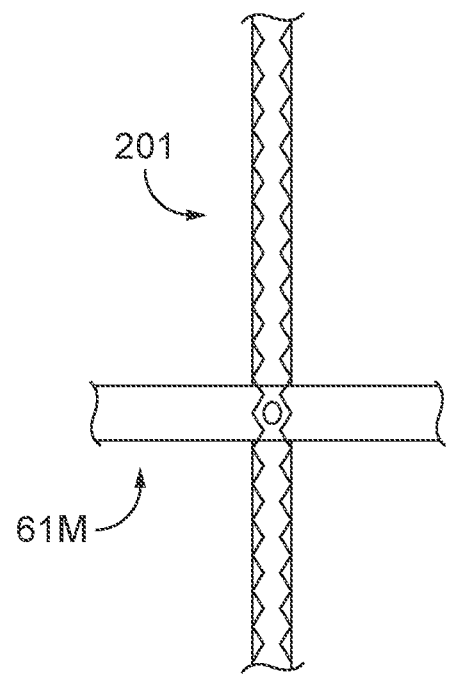
FIG. 3A shows a perspective view of an embodiment of an overhead view of a portion of the embodiment of the asset module shown in FIG. 3.
Figure 3B:
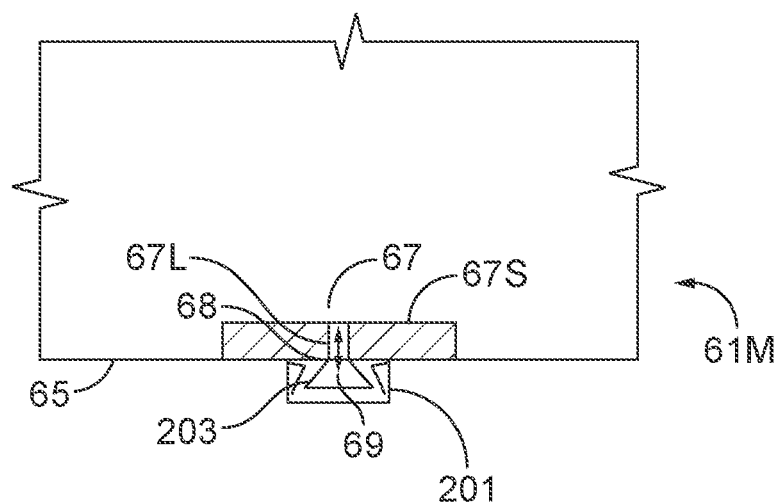
FIG. 3B shows a partial cutaway view of a portion of the embodiment of the asset module shown in FIG. 3.

Certain embodiments of the system 21 permit the size and shape of the asset module 31 to be changed by adjusting the position of the longitudinal vertical bounding elements 61. As illustrated in FIGS. 3, 3A and 3B, one preferred embodiment of the system 21 includes at least one longitudinal vertical bounding element 61 that is movable relative to the horizontal bounding element 71. The embodiment of the system 21 shown in FIG. 3 includes two longitudinal vertical bounding elements 61M, each of which includes bottom edges 65 configured to allow each of the elements 61M to be moved relative to the other bounding elements 61, 62 and the horizontal bounding element 71. To facilitate the positioning of the movable longitudinal vertical bounding elements 61M, the bottom edges 65 of the longitudinal vertical bounding elements 61M cooperatively engage tracks 201 positioned on, at, or below the surface 71S of the horizontal bounding element 71.

The embodiment of the system 21 shown in FIGS. 3, 3A, and 3B include two tracks 201 positioned along two axes 201A and 201B that are generally parallel to each other and also below the surface 71S of the horizontal bounding element 71. To facilitate the generally releasable fastening of the position of each vertical bounding element 61, certain embodiments of the elements 61 may include a bottom edge 65 having a fastener 67 having a fastener support area 67S. One embodiment of the fastener 67 is shown in FIGS. 3A and 3B. The illustrated fastener 67 includes a spring operated leg 67L at a lower end 68 of which a foot 69 is attached. By movement of the leg 67L downward, the foot 69 is moved out of engagement with the inner surface 203 of the track 201, thereby allowing the longitudinal vertical bounding element 61 to be moved.

Figure 4A:
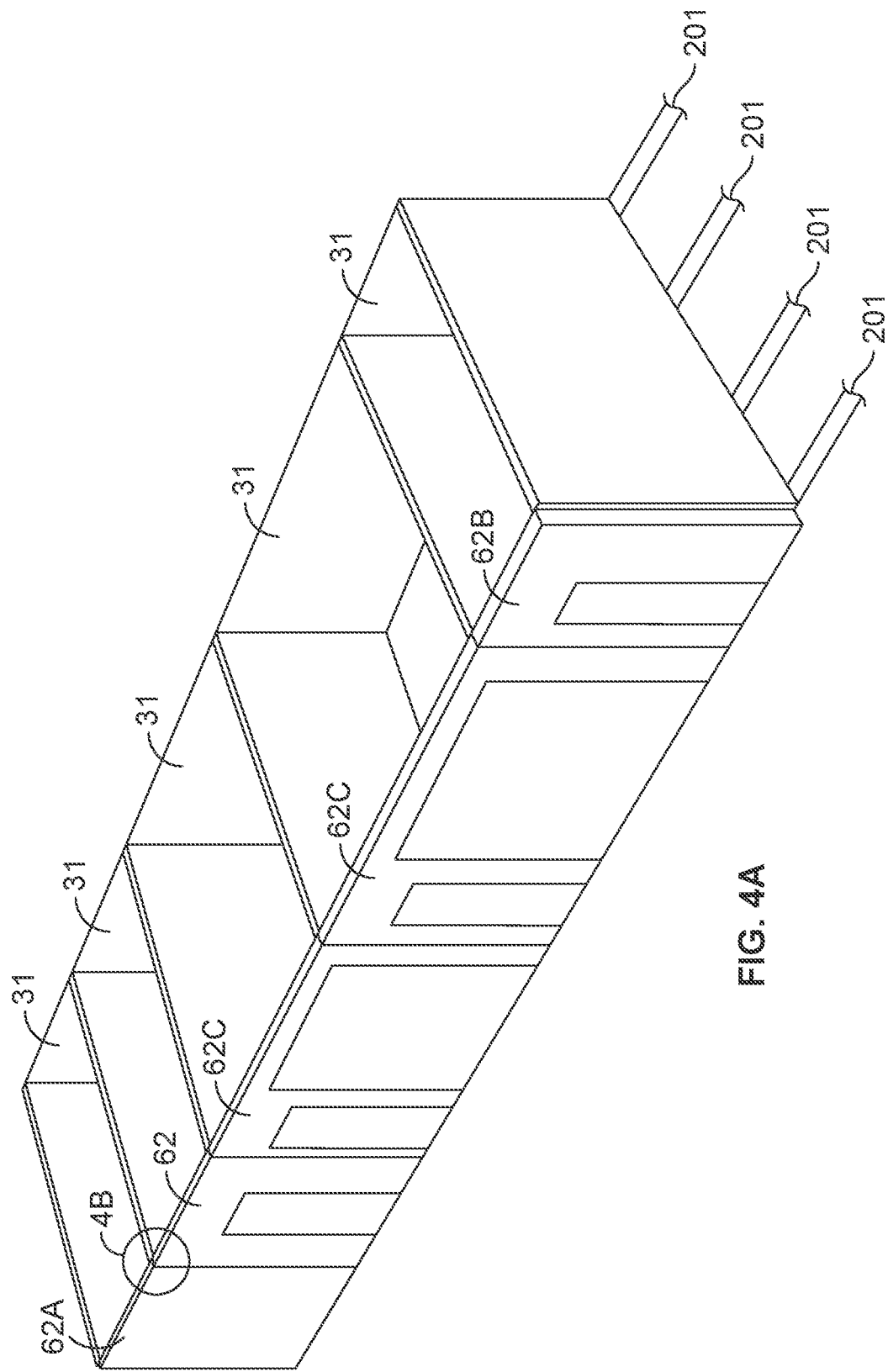
FIG. 4A shows a perspective view of an embodiment of a series of asset modules whose inner volume is definable, in part, by different size, and shape vertical bounding elements.
Figure 4B:
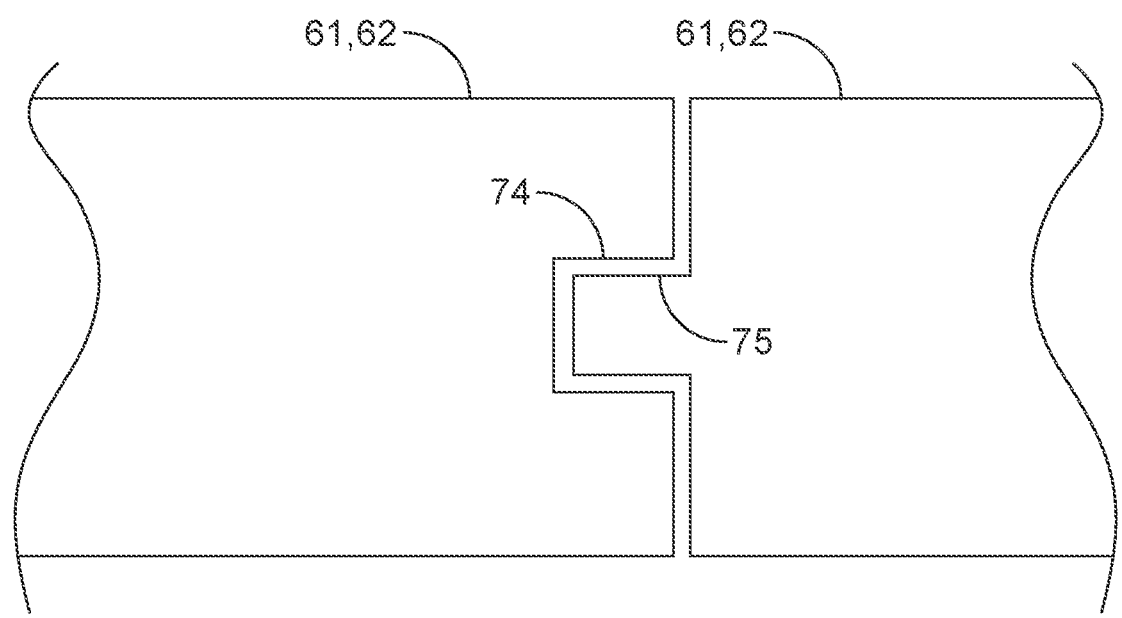
FIG. 4B shows one embodiment of a connection between asset module components shown in FIG. 4A.

The size and shape of the asset module 31 can also be changed by adjusting the size, shape or number of transverse vertical bounding elements 62. To illustrate, an embodiment of the system illustrated in FIG. 4A includes different shapes and size transverse vertical bounding elements 62 to create different size and shape asset modules 31. The illustrated transverse vertical bounding elements 62 are replaceable and moveable. The transverse bounding elements 62 may be removed and replaced by different size and shape vertical bounding elements 62A-62C. In one embodiment of the invention illustrated in FIG. 4A, the transverse bounding elements 62 are mounted in tracks 201 positioned along axis 201C to the horizontal bounding element 71 in a manner similar to the mounting of longitudinal vertical bounding elements 61M to surface 71S. This allows the transverse bounding elements to be slid along tracks 201 to facilitate creating the size and shape asset module 31 desired. In another embodiment, the transverse bounding elements 62 are mounted to the horizontal bounding element 71 by anchors, or pins (not shown). In the embodiment of the system illustrated in FIG. 4A, the transverse vertical bounding elements 62 may be connected to each other by "tongue-and-groove" connectors 74 and 75, as illustrated in FIG. 4B.

In another embodiment, the transverse vertical bounding elements 62 may be connected by other shape grooves, fasteners, or pins (not shown).

Figure 4C:
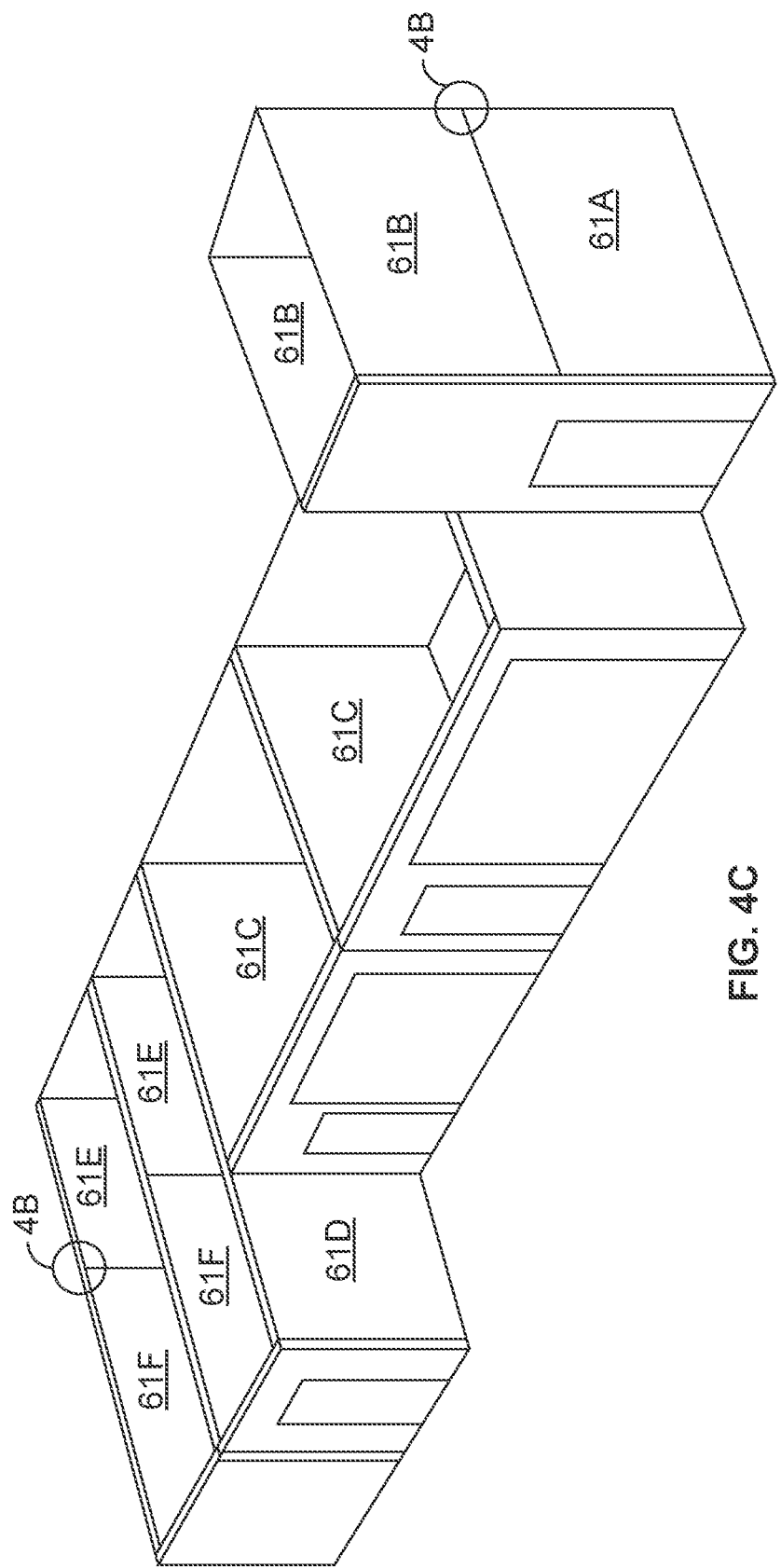
FIG. 4C shows a perspective view of an embodiment of a series of asset modules whose inner volume is definable, in part, by different size, and shape components.

The size and shape of the asset module 31 can additionally be changed by adjusting the size, shape or number of longitudinal vertical bounding elements 61. In an embodiment of the system illustrated in FIG. 4C, longitudinal vertical bounding elements 61A-61F are utilized to create different size and shape asset modules 31. In the embodiment of the system illustrated in FIG. 4C, longitudinal vertical bounding elements, such as 61A and 61B and 61E and 61F are connected to each other as illustrated in FIG. 4B to create the size and shape asset module 31 desired. In another embodiment, the transverse bounding elements 62 may be connected by other shape grooves, fasteners, or pins (not shown). In another embodiment, the longitudinal vertical bounding elements 61 may be mounted in longitudinally oriented tracks (not shown) which run perpendicular to tracks 201 which the longitudinal vertical bounding elements 61 are already mounted in. This allows the transverse bounding elements to be slid along tracks in both the longitudinal and transverse directions to facilitate creating the size and shape asset module 31 desired.

Figure 4E:
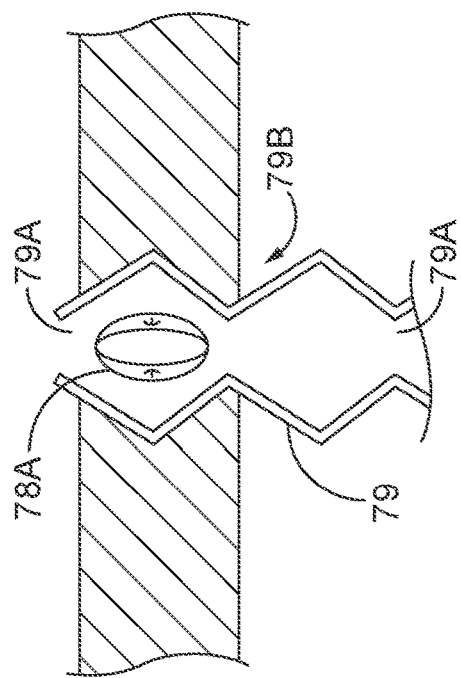
FIG. 4E is a detail view of FIG. 4D.
Figure 4F:
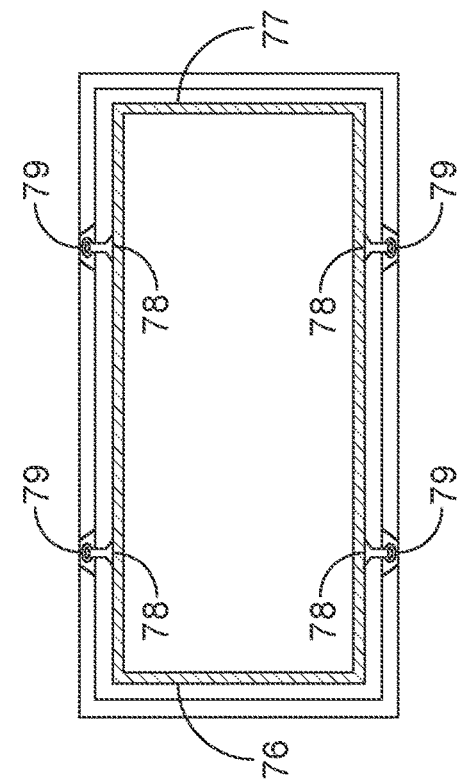
FIG. 4F is a top view of FIG. 4D.
Figure 4D:
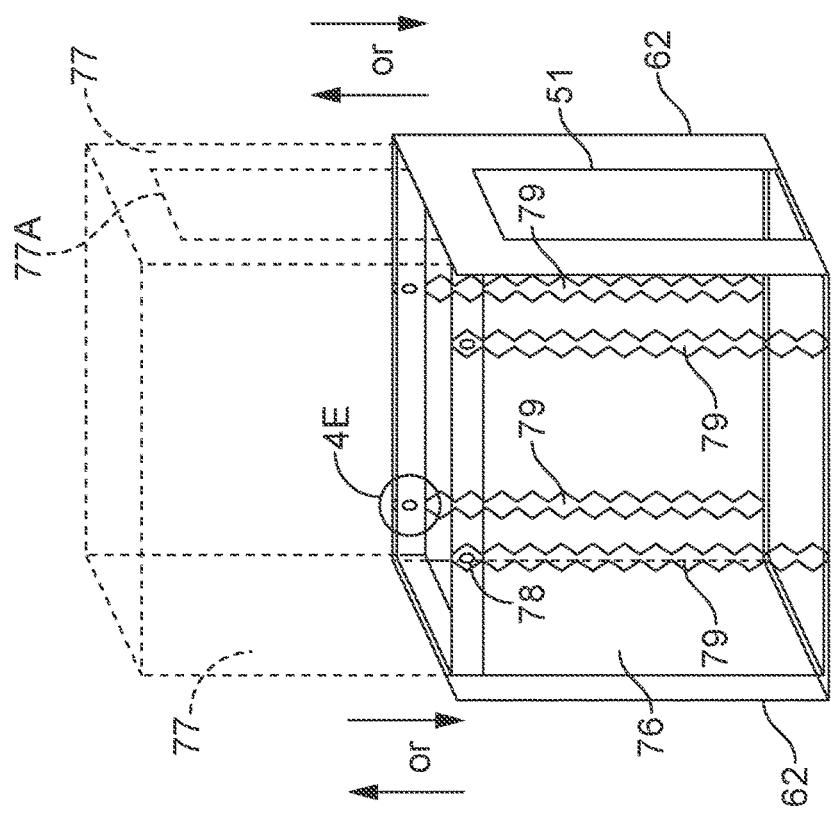
FIG. 4D shows a perspective view of another embodiment of an asset module whose inner volume is definable in a vertical direction by nestable volume definition components.

In another embodiment, the size and shape of an asset module may be changed in a vertical direction through the use of nestable volume definition components 76 and 77 as illustrated in FIGS. 4D-4F. One or more panels 77A on volume definition component 77 are removable to allow entry of a mechanical asset 15 into an interior of the nested volume definition components 76 and 77. The panels 76A and 77A may be removable through the use of tongue-and-groove connectors, as illustrated in FIG. 4B.

Volume definition components 76 and 77 are nestable to achieve a variety of different volumes by moving volume definition component 77 in a vertical direction relative to volume definition component 76. For lightweight volume definition components, this may be accomplished by applying a manual force. For heavier volume definition components, movement of volume definition component 77 in a vertical direction relative to volume definition component 76 may be accomplished by means of mechanical assistance. These means include hand, or hydraulic jacks, or, a motor-operated assist mechanism, such as a motor-operated rack-and-pinion (not shown).

FIGS. 4D-4F show that as the volume definition component 77 is moved vertically relative to volume definition component 76, a pin 78 rigidly attached to volume definition component 77 moves vertically within a "zig-zag" rail system 79. The illustrated "zig-zag" rail system 79 is attached to volume definition component 76. The illustrated "zig-zag" rail system 79 has detent areas 79A for detaining the pin 78 in the detent area 79A. The illustrated pin 78 has a resilient head area 78A which is capable of contracting through a narrow portion 79B of the "zig-zag" rail system 79. Once it is passed through the narrow portion 79B of the "zig-zag" rail system 79, the resilient head area 78A expands, allowing the pin 78 to be detained in the detent area 79A. Once the volume definition component 77 is nested at a desired vertical location relative to volume definition component 76, volume definition component 77 is held in a fixed vertical position relative to volume definition component 76 by the resilient head area 78A of pin 78 being detained within a desired detent area 79A of the "zig-zag" rail system 79 at each corner of volume definition components 76 and 77.

Figure 5:
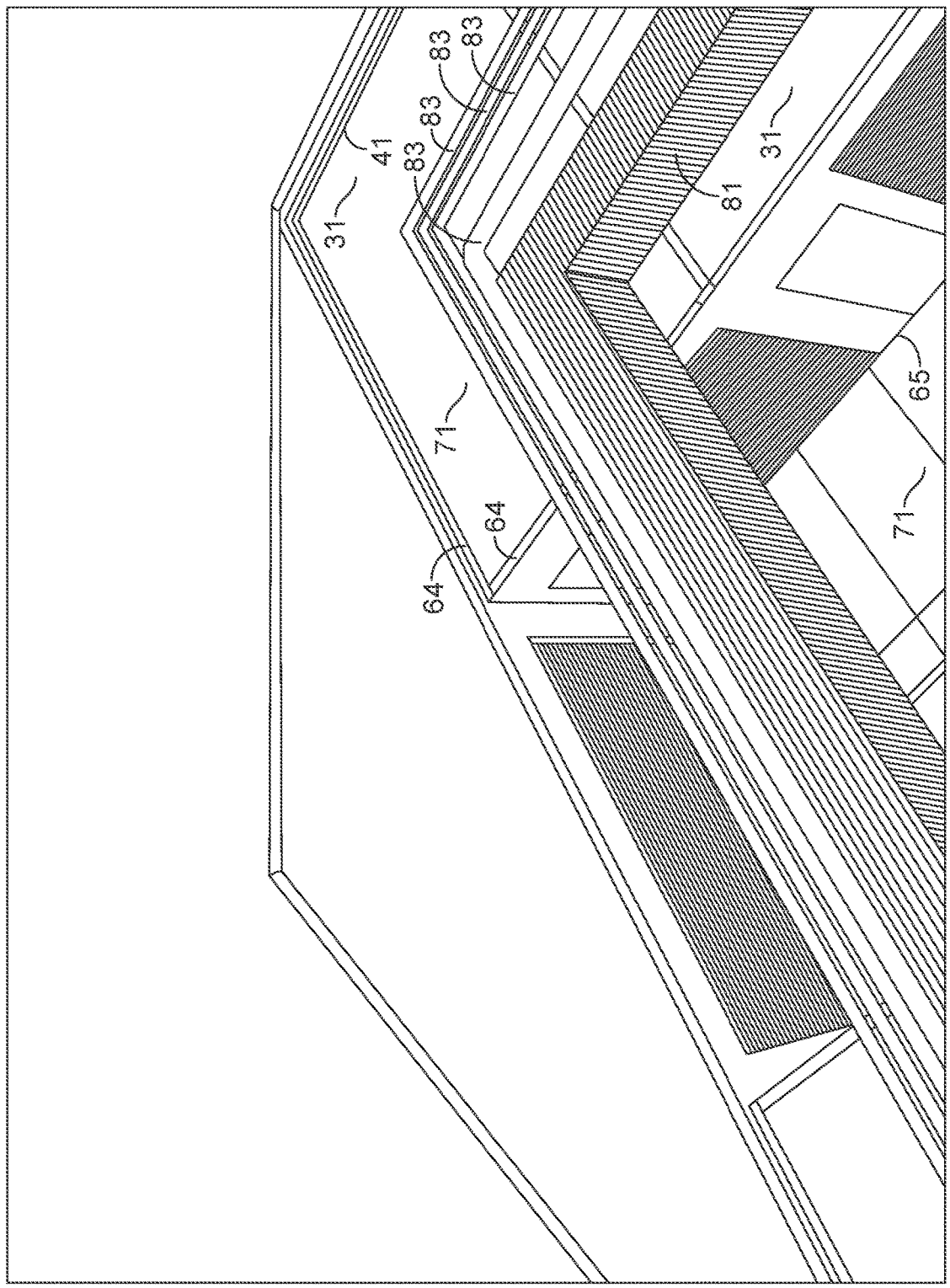
FIG. 5 shows a perspective view of an embodiment of the system, in which a section of the outer asset module is cut away.

To facilitate the movement of the one or more vertical bounding elements 61 relative to the horizontal bounding elements 71, embodiments of the system 21, as illustrated in FIGS. 1 and 5, include support components 23, which support building service components, such as building HVAC ("Heating Ventilation and Air Conditioning") 81, building and asset module 31 piping and tubing 83, and electrical wiring connectable, as needed, for the thereby defined asset module 31. In one embodiment, one or more of such support components 23 may be positioned above the asset modules 31, as illustrated in FIG. 1. Such embodiments advantageously allow the size and shape of the asset modules 31 to be changed without the need to reroute infrastructure components or to modify the asset module 31 to allow infrastructure components to run through it.

The above building service components allow control of the atmosphere and lighting of the building outside the asset modules. Embodiments of the invention advantageously allow for separate control of the atmosphere and lighting of each of the asset modules 31 as discussed below. Additional embodiments of the invention may include control of mechanical asset systems as discussed below.

Figure 6:
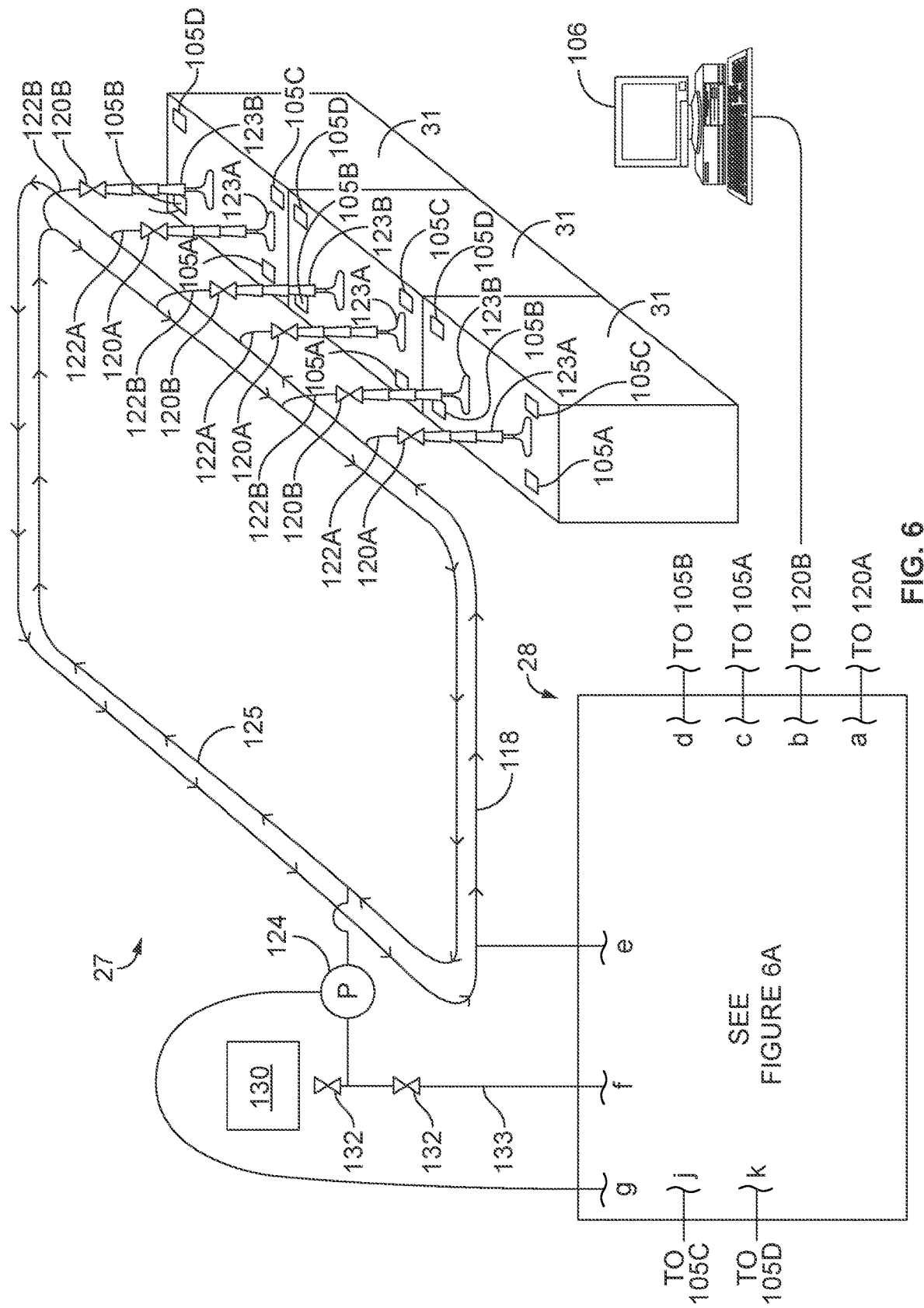
FIG. 6 shows a diagrammatic view of the control system for control of the atmosphere of each asset module.
Figure 6A:
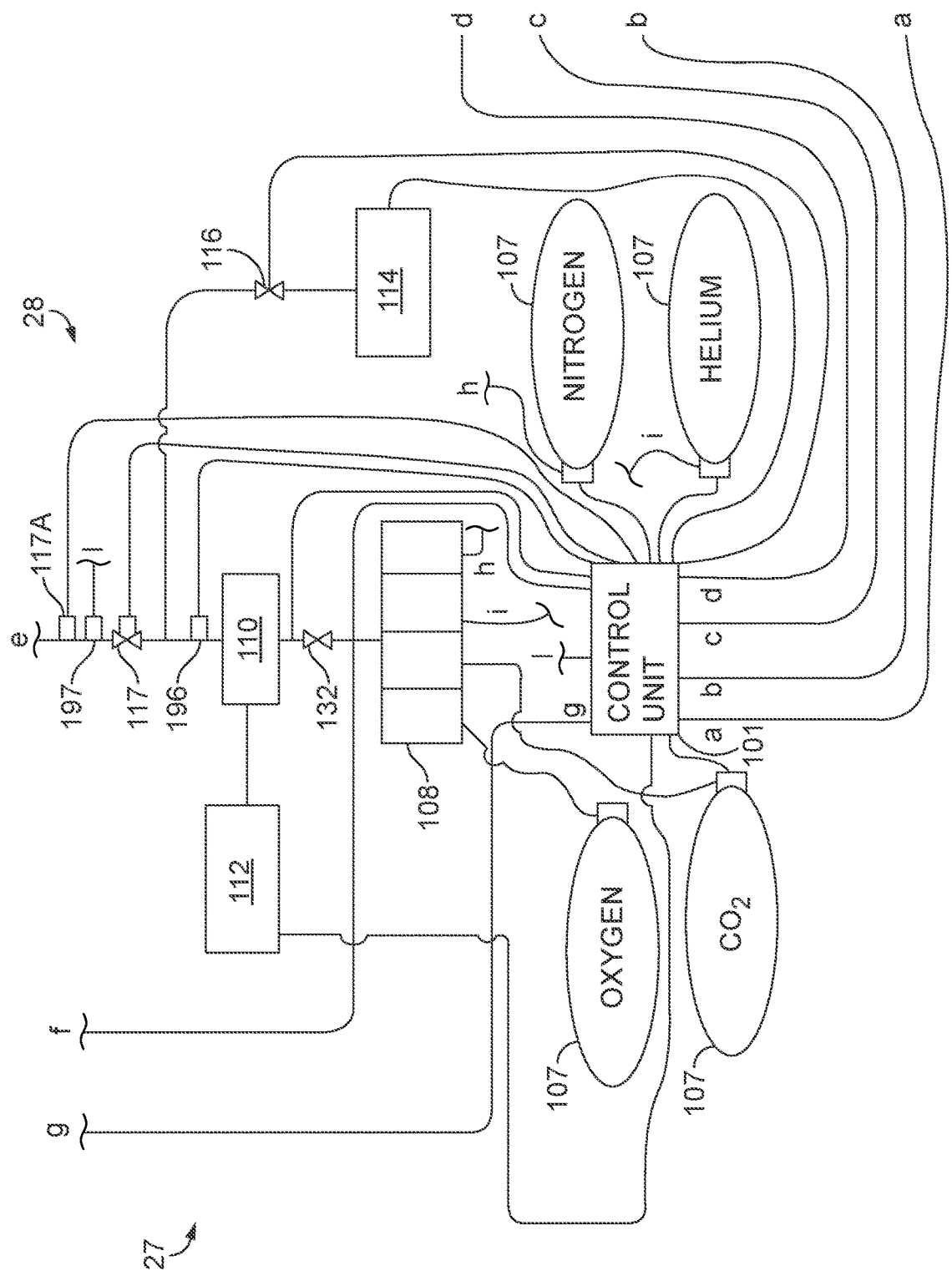
FIG. 6A is a detail view of FIG. 6.

As illustrated in FIGS. 6 and 6A, certain preferred embodiments of the system 21 include a closed system 27 controlled by a closed system control system 28 for selectively producing a controlled atmosphere in each asset module 31. An atmosphere control unit 101 is generally used for controlling the atmosphere within one or more asset modules 31 and more specifically to affect the temperature, moisture content, and airborne particle content, or relative humidity of the atmosphere in any one or more asset modules 31. Certain preferred embodiments of the atmosphere control unit 101 can monitor/remove and/or exchange the gases which make up the atmosphere within the asset modules 31 and may exhaust those gases when they become undesirable or dangerous to a person or asset that may be in the asset module 31. Such a gas is carbon monoxide that may be produced when, for example, an internal combustion engine is allowed to run without control. The atmosphere control unit 101 may further include one or more sensors 105A, 105B, 105C and 105D that provide information about conditions within the asset modules 31, such as through visual, audible, and/or tactile means. For example, one such indicator 105A may inform a visitor whether and when the composition of the atmosphere inside the asset module 31 is safe for human occupancy and when it is unsafe, depending upon the current molecular composition of an atmosphere inside the asset module. Indicator control unit 105B may monitor the temperature within the control unit. Indicator control unit 105C may monitor the relative humidity within the control unit. Indicator control unit 105D may monitor the pressure within the control unit. The atmosphere control unit 101 is also used to control the molecular makeup of the controlled atmosphere within the asset module 31 for asset-preservation reasons. By replacing the existing asset module 31 non-controlled atmosphere composed of air with controlled atmosphere composed of an inert gas, oxidation and other reactions which may degrade the mechanical asset, may be eliminated or reduced. The atmosphere control unit may also control lighting within each asset module 31.

FIGS. 6 and 6A further illustrate a control system 28 for the closed system 27 including control of the closed system 27 by the atmospheric control unit 101. The atmospheric control unit 101 receives input from indicators 105A, 105B, 105C, 105D, etc. that each asset module 31 may contain, on input parameters such as the temperature, pressure, relative humidity and molecular make-up of the atmosphere of each asset module 31 through lines c and d, j and k in FIG. 6. The atmospheric control unit 101 compares these input parameters to control parameters input by a client input through a central server unit 106, or by other means. The atmospheric control unit 101 also may have the capability of reporting back on these parameters to a client, so that the client may monitor these atmospheric parameters remotely. After comparison of the input parameters to the control parameters, the atmospheric control unit may initiate any required changes to the atmosphere of each asset module 31, by modifying and controlling atmospheric parameters of each asset module 31. The atmospheric parameters controlled may include temperature, pressure, relative humidity and molecular composition of an atmosphere of each asset modules 31. This may be accomplished by supplying gas from one of pressurized tanks 107 to the asset module 31. Pressurized tanks 107 may contain a supply gas including oxygen, carbondioxide, nitrogen and helium. Sensors 117A, 195, 196 and 197 in FIG. 6A allow these atmospheric parameters of gas supplied from pressurized tanks 107 to be monitored so as to allow control of atmospheric parameters in the asset module 31 based on monitored parameters of supplied gas to the asset module 31. Further embodiments of the preservation controls may include a single set of components capable of controlling atmospheric parameters of the asset modules. Atmospheric parameters of the asset module may be controlled by allowing the atmosphere of each asset module to be part of the closed system 27, which allows the atmospheric parameters to be controlled. The atmospheric parameters may be controlled include temperature, pressure, relative humidity and molecular composition of an atmosphere of each of the asset modules.

Pressurized tanks 107 containing gases such as oxygen, carbon dioxide, nitrogen and helium may be supplied to the asset modules 31 via a tank control valve 108. The control valve 108 may allow selection of the type of gas desired and regulates the pressure and flow of the gas to be supplied to the asset modules 31. Sensor 195 may monitor the molecular composition of supplied gas flowing from the control valve 108 and reports the supplied gas molecular composition to the atmospheric control unit 101. After the supplied gas is regulated by the tank control valve 108, the gas may pass through a heat exchanger 110. The heat exchanger 110 cools, or heats the gas to the desired temperature. A heating/cooling unit 112 may supply the necessary temperature heat exchange fluid to properly regulate the temperature of the gases to the asset modules 31. The heating/cooling unit 112 is regulated by the atmosphere control unit 101. Sensor 196 may monitor the temperature of supplied gas flowing from the heat exchanger 110 and reports the supplied gas temperature to the atmospheric control unit 101. After the supplied gas leaves the heating/cooling unit 112, a humidifier 114 may be able to supply moisture to the gas, if and when the relative humidity of the gas is too low. The humidifier 114 supplies moisture through a humidifier control valve 116. The humidifier 114 and humidifier control valve 116 may be controlled by the atmospheric control unit 101. Sensor 197 may monitor the relative humidity of supplied gas flowing from the output of the humidifier 114 and reports the supplied gas relative humidity to the atmospheric control unit 101. Finally, a pressure control valve 117, which may be controlled by the atmospheric control unit 101, that may regulate pressure of the gases to the asset modules 31, based on pressure inputs supplied by pressure sensor 117A and asset module 31 indicators 105A and/or 105B. Pressure sensor 117A may monitor the pressure of supplied gas flowing from the pressure control valve 117 and may report the pressure of the supplied gas to the atmospheric control unit 101. Symbols a-k in FIGS. 6 and 6A are used to assist match portions of line segments in these figures which have discontinuities in the same figure, or between FIGS. 6 and 6A.

The supplied gases in closed system 27 described relative to FIG. 6A above may flow to the asset modules 31 through a supply header 118, as illustrated in FIG. 6. The supplied gas may then be directed to a selected asset module 31 by selective use the asset module inlet control valve 120A for the selected asset module 31. The control valve 120A for each asset module 31 may be controlled by atmospheric control unit 101 through line a in FIGS. 6 and 6A. The asset module inlet control valve 120A for each asset module 31 may be located on an inlet branch 122A to each asset module 31 in certain embodiments. In some embodiments, asset module inlet control valve may be controlled manually. Between each asset module inlet control valve 120A and asset module 31 may be a flexible supply component 123A. The flexible supply component 123A may allow for a variable distance between the asset module inlet control valve 120A and asset module 31 to accommodate asset modules 31 of varying height. When it is desired to supply a selected asset module 31 with a selected controlled atmosphere consisting of selected controlled atmospheric parameters including a selected controlled atmosphere molecular composition, selected controlled atmosphere temperature, selected controlled atmosphere pressure and selected controlled atmosphere relative humidity, supplied gas composed of a selected molecular composition, selected temperature, selected pressure and selected relative humidity, as specified by a client at central server unit 106, the atmospheric control unit 101 may be supplied to the asset module 31. The supplied gas may be supplied to the specified asset module 31, until the selected controlled atmosphere molecular composition as monitored by sensor 105A may be as specified by the client, the selected controlled atmosphere temperature as monitored by sensor 105B may be as specified by the client, the selected controlled relative humidity as monitored by sensor 105C may be as specified by the client, and the selected controlled atmosphere pressure as monitored by sensor 105D may be as specified by the client. The asset module 31 may be normally pressurized to a pressure just slightly greater than atmospheric to prevent infiltration of air into the pressurized asset module. At this point the atmospheric control unit 101 closes asset module inlet control valve 120A in order to maintain pressure inside the selected asset module 31. Once pressurized, the atmospheric control unit 101 monitors the molecular composition, temperature, pressure, and relative humidity of the gas in the selected asset module 31 for any deviation from desired set points, and supplies additional gases to the asset module 31 as necessary, through the above described system 21.

As further illustrated in FIG. 6, when it is desired to remove the mechanical asset 15, or enter an asset module 31, the supplied gas may be removed by utilizing pump 124 to evacuate the asset module 31. Pump 124 receives gases evacuated from an evacuated asset module 31 through discharge header 125. Certain embodiments of discharge header 125 are connected to each asset module 31 through discharge flexible component 123B, asset module discharge control valve 120B and discharge branch 122B. Each asset module 31 has an asset module discharge control valve 120B to allow selective evacuation of each asset module 31. The control valve 120B for asset module 31 may be controlled by atmosphere control unit 101 through line b in FIGS. 6 and 6A. In an alternate embodiment, the asset module discharge control valve 120B may be controlled manually. Pump 124 discharges gas to either a holding tank 130, or to a discharge line 133 which feeds back to the control valve 108, to allow the gas to be returned to the appropriate tank 107 via tank control valve 108. Hand operated valves 132 (FIGS. 6 and 6A) allow gas on the discharge side of pump 124 to be selectively routed to the holding tank 130, or to the tank control valve 108. Pump 124 is controlled by the atmospheric control unit 101 through line g in FIGS. 6 and 6A. The above described components in FIGS. 6 and 6A all form a portion of the closed system 127.

Figure 7:
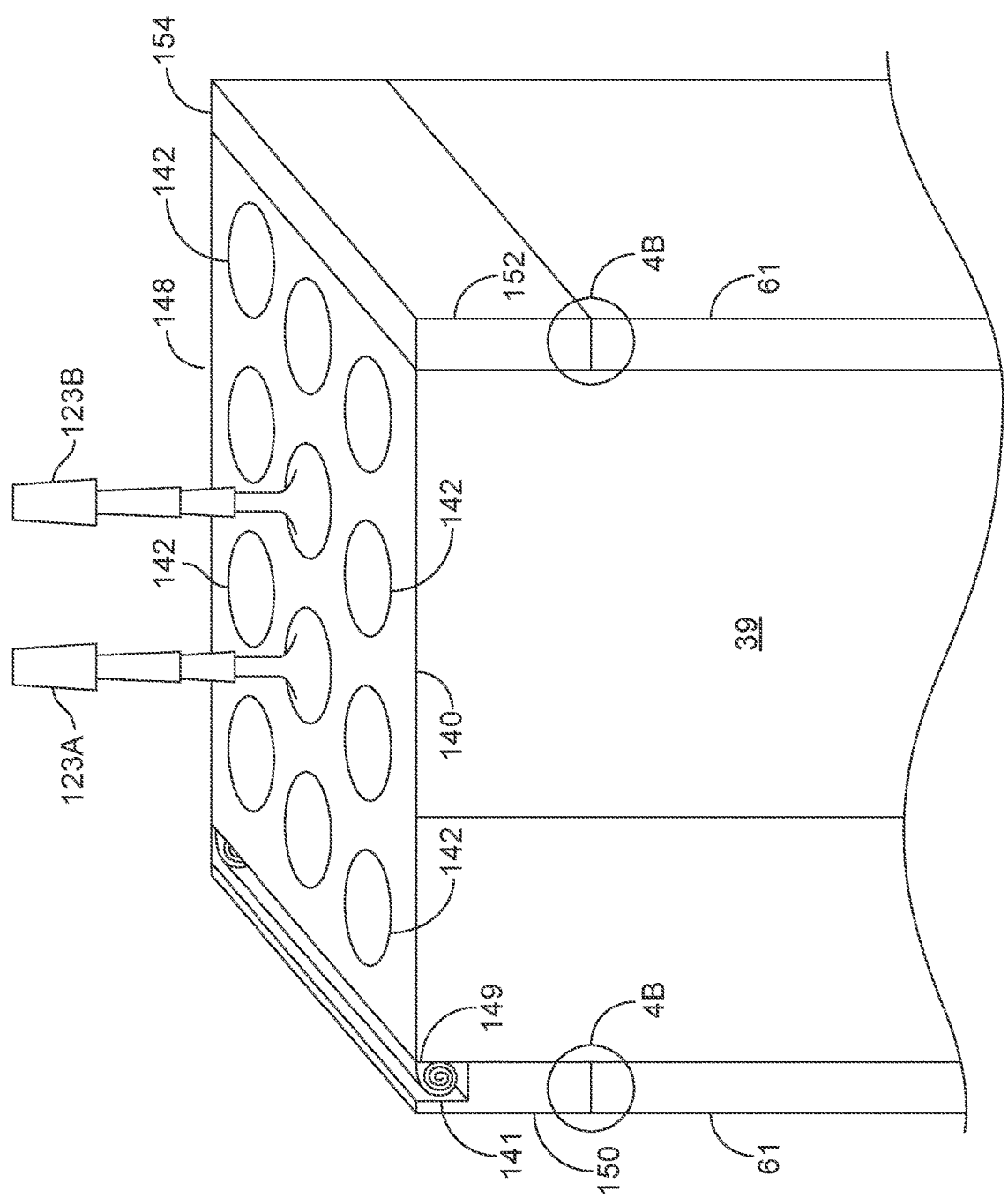
FIG. 7 shows a perspective view of an embodiment of a top portion of an asset module.
Figure 8:
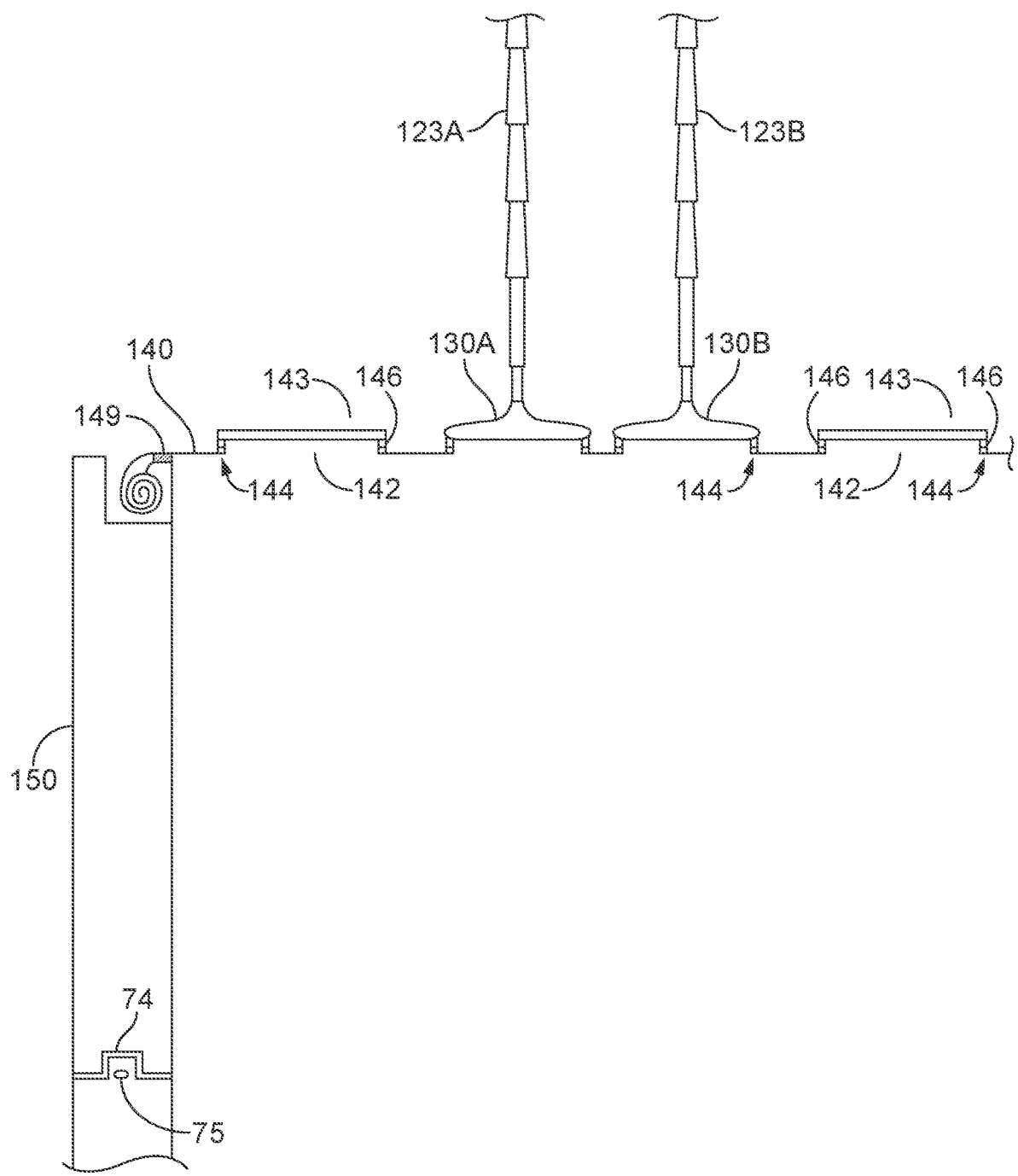
FIG. 8 is a section view of a portion of FIG. 7.

As illustrated in an embodiment of the system 21 in FIGS. 7-9, the top portion of the asset module 31 has a pressure boundary formed through use of a flexible sheet material cover 140. The flexible sheet material cover 140 may be transparent. The flexible sheet material cover 140 may be initially contained around a rotatable roll 141. After an asset module 31 is sized and positioned and a mechanical asset 15 may be located therein, a flexible sheet material cover holder panel 150 may be installed on a top surface of one of the two longitudinal vertical bounding elements 61 forming a periphery of the asset module 31. The top surface of one of the two longitudinal vertical bounding elements 61 forming a periphery of the asset module and a lower surface of the flexible sheet material cover holder panel 150 are connected in certain embodiments with tongue-and-groove connectors as illustrated in FIG. 4B. The flexible sheet material cover 140 and attached rotatable roll 141 may be installed on an upper portion of the flexible sheet cover material cover holder panel 150. A flexible sheet material cover receiving panel 152 may be installed on a top surface of the other of the two longitudinal vertical bounding elements 61 forming a periphery of the asset module 31. The top surface of the of the two longitudinal vertical bounding elements 61 forming a periphery of the asset module 31 and a lower surface of the flexible sheet material cover receiving panel 152 are connected with tongue-and-groove connectors as illustrated in FIG. 4B.

Figure 7A:
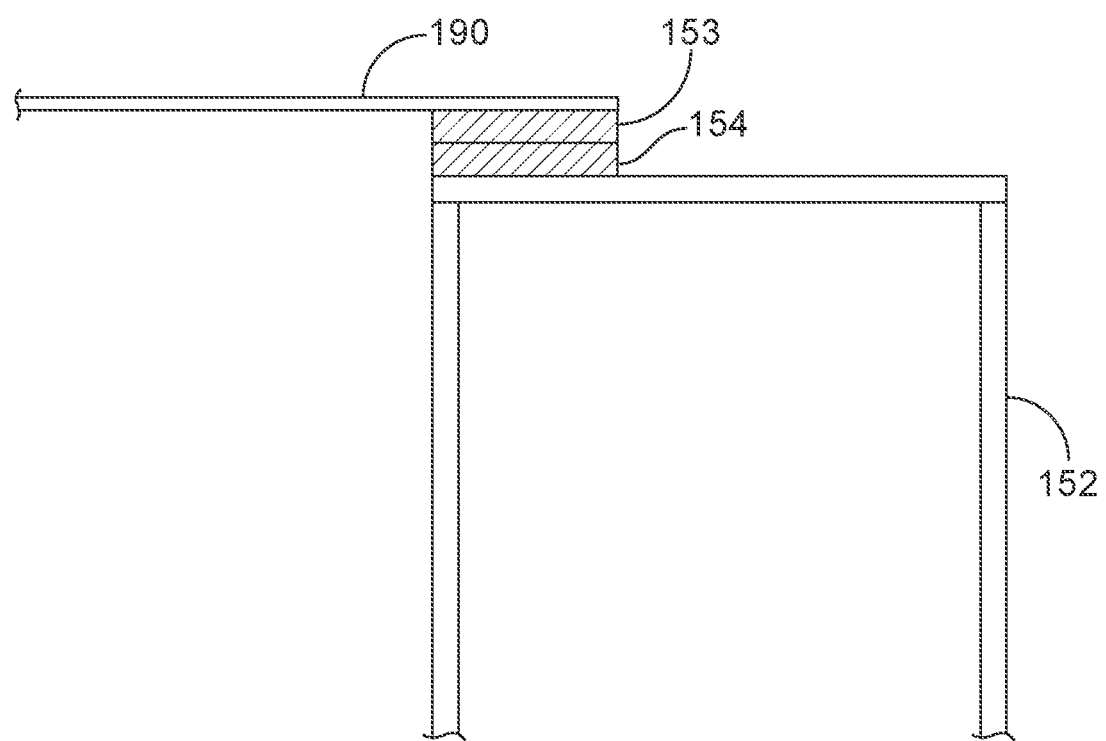
FIG. 7A is a detail view of FIG. 7.

After the flexible sheet material cover holder panel 150 and flexible sheet material cover receiving panel 152 are installed, an end of flexible sheet material cover 140 is pulled from rotatable roll 141, across a span 148 between the two longitudinal vertical bounding elements 61 forming a periphery of the asset module 31, and fastened to a fastening element on the flexible sheet material cover receiving panel 152. A gasket 149 may be installed proximal to the rotatable roll 141 prevents leakage alongside the bottom surface of flexible sheet material cover 140 proximal the rotatable roll 141. As illustrated in FIG. 7A, the end of the flexible sheet material cover 140 has a strip magnet 153 installed on a bottom surface. This strip magnet 153 is held to magnetic metal strip 154 attached to flexible sheet material cover receiving panel 152, thereby permitting a seal to be formed between the flexible sheet material cover 140 and the flexible sheet material cover receiving panel 152 (This is a method envisioned to satisfy invention objective). The installation of the flexible sheet material cover receiving panel 152, along with longitudinal vertical bounding elements 61, transverse vertical bounding elements 62, horizontal bounding element 71 and outboard vertical bounding element 39 form a complete pressure boundary for the asset module 31. If needed, to further improve integrity of the pressure boundary, disposable gasket material may be installed around edges where surfaces meet.

As illustrated in FIG. 7, the flexible sheet material cover 140 contains a plurality of apertures 142. As illustrated in FIG. 8, each aperture may include a magnetic seal ring 144 located at the circumference of the aperture 142. As illustrated in FIG. 9, a lower portion of the suction flexible component 123A and discharge flexible component 123B may include a magnetic ring 146 attached to each flexible component 123A and 123B.

After installation of the flexible sheet material cover 140, the flexible components 123A and 123B may be attached to the flexible sheet material cover 140 by selecting apertures 142 on the flexible sheet material cover 140 most proximal to the flexible components 123A and 123B. After the appropriate apertures 142 are selected, the flexible components 123A and 123B may be connected to the selected apertures 142. This may be accomplished by allowing the magnetic ring 146 on the flexible components 123A and 123B and the magnetic metal seal ring 144 on the apertures 142 of the flexible sheet material cover 140 to come into contact, providing a sealing force between sealing surfaces on the magnetic ring 146 and the magnetic seal ring 144. As illustrated in FIG. 9A, a gasket 149A may be installed around the outer circumference of the magnetic ring 146 and the magnetic seal ring 144 to further reduce the possibility of leakage past this sealing area. As illustrated in FIG. 8, apertures 142 on the flexible sheet material cover 140 which may not be used are covered with covers 143 to prevent leakage of gases. In certain embodiments, the covers 143 may include attached magnetic rings 146. This advantageously allows the covers 143 to be easily installed to the magnetic seal rings 144 in a manner similar to that illustrated in FIG. 9A, to prevent leakage between the apertures 142 and covers 143.

Figure 10:
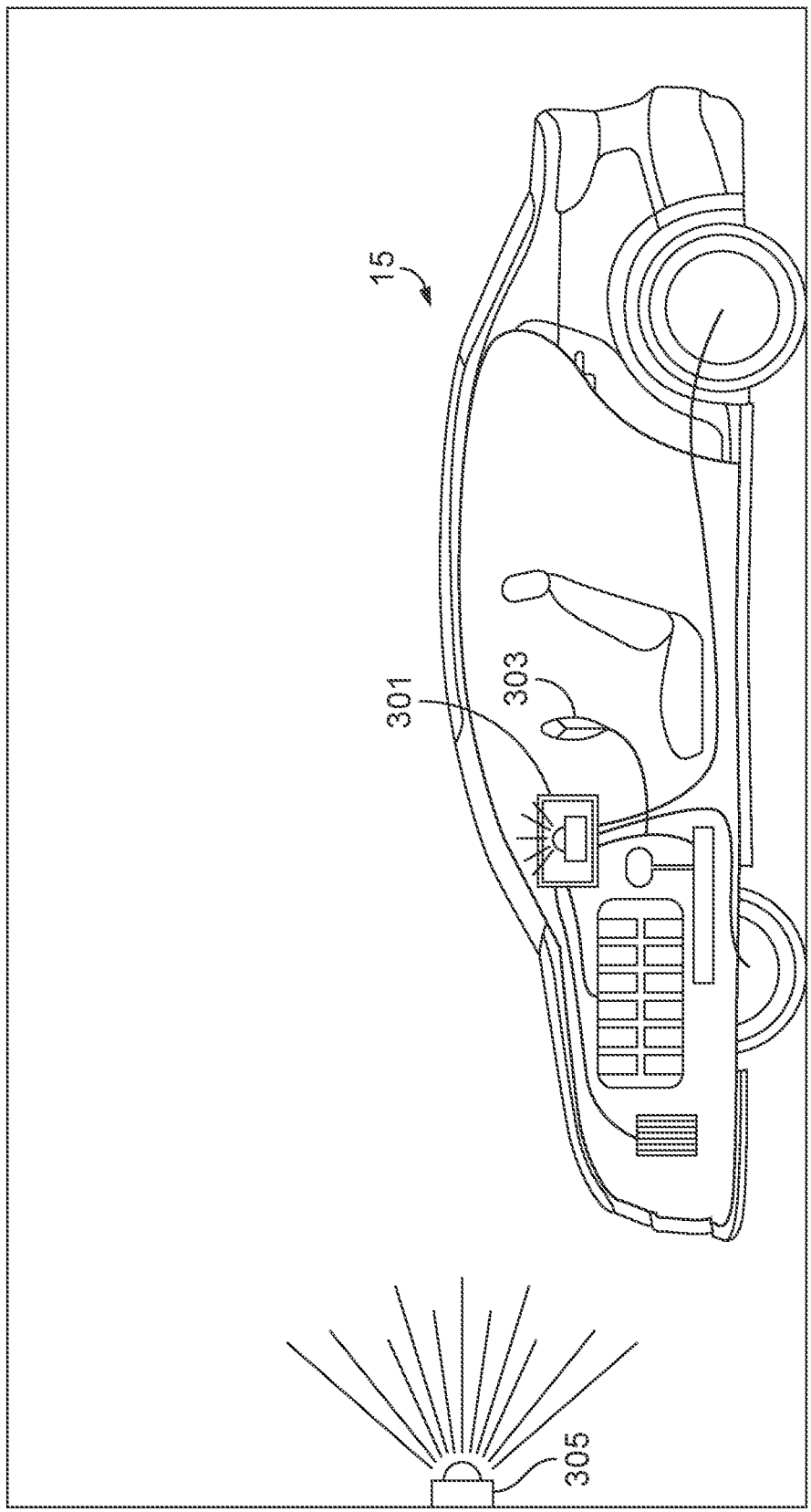
FIG. 10 shows an embodiment in which the condition of a mechanical asset within the asset module may be communicated to an external source.

As illustrated in FIG. 10, certain preferred embodiments of the system 21 include a diagnostic control 301 for monitoring and manipulating the onboard computer and sensors of the mechanical asset. The diagnostic control 301 can obtain information from the mechanical asset's sensors and onboard computers. The diagnostic control 301 can set certain parameters within the onboard computer The diagnostic control 301 can communicate with the mechanical asset using OBD (On-Board Diagnostics), OBD 1.5, IBD II, EOBD (European On-Board Diagnostics, EOBD II, or through another monitoring system. An example of such a diagnostic control is shown in FIG. 8. It includes an onboard wellness administrator 303 positionable within the asset 15 and which can communicate with an exterior communicator 305. The exterior communicator 305 may then communicate through known wired or wireless means to provide data regarding the status of the mechanical asset 15. The exterior communicator 305 is also capable of transmitting information to the control unit 101. The control unit 101 may take corrective action when any adverse action received is possibly related to an adverse atmospheric condition, such as, for example, temperature, or relative humidity.

Figure 11:
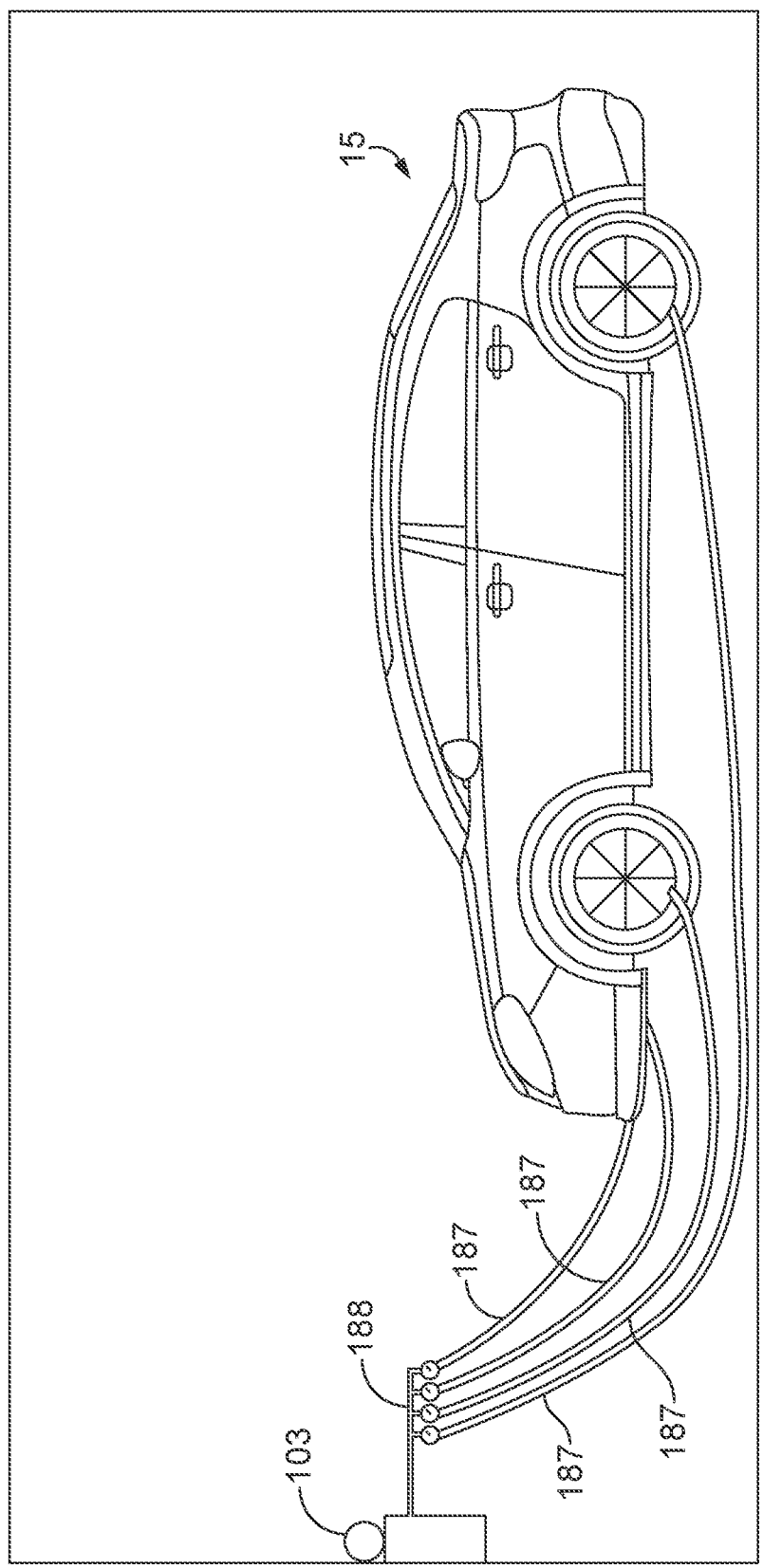
FIG. 11 shows an embodiment in which the inflatable components of a mechanical asset may be maintained to proper inflation pressure.

As illustrated in FIG. 11, certain preferred embodiments of the system 21 include an asset-inflation-pressure control 103 for controlling the pressure of the mechanical asset's inflatable components. The asset-inflation-pressure control 103 can be constructed and operate in any manner known to someone skilled in the art. In one embodiment, the asset-inflation-pressure control may work by connecting a hose or tubing 187 to each tire. The pressure in the tube may be monitored by a pressure gauge and regulator 188. When the pressure is above a predetermined set point, the pressure control unit 103 allows air to escape from the tube. When pressure is below a predetermined set point, pressured air may be supplied to the tubing 187 by an air pump or compressor (not shown).

Figure 12:
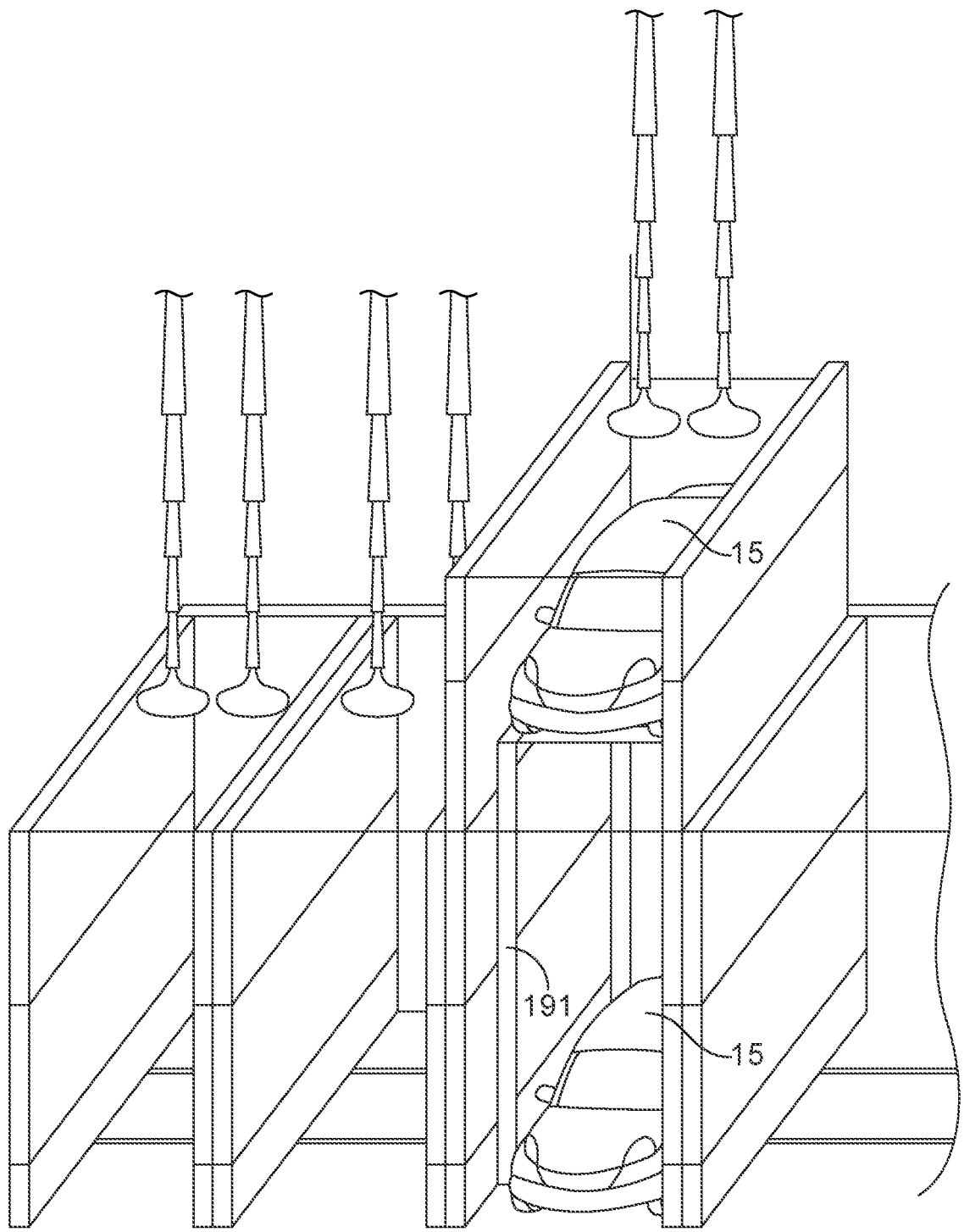
FIG. 12 shows a wheeled stand by which a plurality of mechanical assets may be housed within an asset module.

As illustrated in FIG. 12, certain preferred embodiments of the system 21 include a wheeled stand 191 for allowing a plurality of mechanical assets 15 to be housed within an asset module 31.

Certain preferred embodiments of the system 21 include battery-charge control for monitoring, maintaining and manipulating the charge on the mechanical asset's battery (if present) (not shown). The battery-charge control can be constructed and operate in any manner obvious to someone skilled in the art. In one embodiment, the battery-charge control may work by connecting charging cables to the battery and run through an amp meter and to a charger. The charger can either send a charge to the battery or drain a charge from the battery, based on the readings of the meter and the input from the control user.

Certain preferred embodiments of the system 21 may include a lift control (not shown), which may be used to raise the mechanical asset 15 off the ground. The lift can be constructed and operate in any manner obvious to one skilled in the art. The lift control may be used to raise the mechanical asset 15 from the floor allowing access the underside of the mechanical asset 15. The lift control may be further used to control the amount of pressure placed on the mechanical asset's ground anchoring portion.

Certain preferred embodiments of the system 21 may include rollers (not shown) under the drive wheels of the mechanical asset 15 which has drive wheels. The rollers allow the mechanical asset's drive wheels to turn while keeping the mechanical asset stationary. The rollers could further be connected to a dynamometer for measuring various performance characteristics of the mechanical asset Certain preferred embodiments of the system 21 may include tools (not shown) for maintenance service on the mechanical asset 15. A computer system may be used to identify the tools needed for a mechanical asset, to avoid storing unnecessary tools in or about the asset module 31.

Although the present invention has been described in considerable detail with references to certain preferred versions thereof, other versions are possible. Therefore, the spirit and scope of the appended claims should not be limited to the description of the preferred version contained herein.

The invention claimed is:

1. A system for the storage and preservation of an asset, comprising:
    an asset module changeable in size and shape, wherein the asset module comprises one or more vertical bounding elements and one or more horizontal bounding elements, the one or more vertical bounding elements and the one or more horizontal bounding elements defining an inner volume of the asset module, wherein the inner volume is changeable in size and shape by movement of at least one of the one or more vertical bounding elements relative to the one or more horizontal bounding elements;
    a discharge control valve and an inlet control valve each connected to the asset module;
    an atmospheric control element comprising one or more sensors configured to monitor an atmosphere of the inner volume;
    one or more parameters of the inner volume, the one or more parameters comprising a composition of the atmosphere, a temperature of the atmosphere, a humidity of the atmosphere, and a pressure of the atmosphere, wherein one or more of the discharge control valve and the inlet control valve are adjusted by the atmospheric control element based on the one or more parameters to control the atmosphere within the inner volume.

2. The system according to claim 1 further comprising a track that facilitates movement of one or more of the vertical bounding element and the horizontal bounding element.

3. The system according to claim 2, wherein the track is two or more parallel tracks.

4. The system according to claim 1, wherein the asset module comprises an aperture to facilitate ingress and egress to and from the asset module.

5. The system according to claim 4, wherein the aperture transitions between an open state and a closed state.

6. The system according to claim 5 further comprising an authentication element communicatively coupled to the aperture, wherein the authentication element comprises one or more of a human screener, a lock and key, a pin pad, a magnetic identification, Radio Frequency Identification, or biometric, and disables and enables each of the open state and the closed state.

7. The system according to claim 6, wherein the authentication element is a pin pad.

8. The system according to claim 6, wherein the authentication element is a radio frequency identification (RFID).

9. The system according to claim 1 further comprising a tank in communication with the asset module, the tank containing a gas deliverable to the asset module.

10. The system according to claim 9, wherein the gas is one or more gases selected from the group comprising of: oxygen, carbon-dioxide, nitrogen and helium.

11. The system of claim 1 further comprising a heat exchanger configured to heat or cool the gas.

12. The system of claim 1 further comprising a humidifier configured to apply moisture to the gas.

13. The system of claim 1 further comprising a pressure control valve configured to regulate pressure of the gas.

14. A system for the storage and preservation of an asset, comprising:
    an asset module changeable in size and shape, wherein the asset module comprises one or more vertical bounding elements and one or more horizontal bounding elements, the one or more vertical bounding elements and the one or more horizontal bounding elements defining an inner volume of the asset module, wherein the inner volume is chargeable in size and shape by movement of at least one of the one or more vertical bounding elements relative to the one or more horizontal bounding elements;
    a discharge control valve and an inlet control valve each connected to the asset module,
    an atmospheric control element comprising one or more sensors configured to monitor and control an atmosphere of the inner volume;
    one or more parameters of the inner volume, the one or more parameters comprising a composition of the atmosphere, a temperature of the atmosphere, a humidity of the atmosphere, and a pressure of the atmosphere;
    a pressurized tank containing a gas deliverable to the asset module;
    a heat exchanger configured to heat or cool the gas;
    a humidifier configured to apply moisture to the gas; and
    a pressure control valve configured to regulate pressure of the gas:
    wherein one or more of the discharge control valve and the inlet control valve are adjusted by the atmospheric control element based on the one or more parameters to control the atmosphere within the inner volume.

15. The system according to claim 14, wherein the gas is one or more gases selected from the group comprising of: oxygen, carbon-dioxide, nitrogen and helium.

16. The system according to claim 14 further comprising a supply header configured to deliver the gas through the inlet control valve to each of the asset modules.

17. The system according to claim 14 further comprising a discharge header configured to remove the gas through a discharge control valve from each of the two or more asset modules.

18. A system for the storage and preservation of an asset, comprising:
- two or more asset modules, each asset module comprising a vertical bounding element and a horizontal bounding element, the vertical bounding element and the horizontal bounding element defining an inner volume of each of the two or more asset modules, wherein the inner volume is changeable in size and shape by movement of the vertical bounding element relative to the horizontal bounding element;
- a track in communication with one of the vertical bounding element and the horizontal bounding element to facilitate movement of the one of the vertical bounding element and the horizontal bounding element;
- a discharge control valve and an inlet control valve each connected to the two or more asset modules;
- an atmospheric control element comprising one or more sensors configured to monitor an atmosphere of the inner volume, the one or more parameters of the inner volume, the one or more parameters comprising a composition of the atmosphere, a temperature of the atmosphere, a humidity of the atmosphere, and a pressure of the atmosphere;
- a tank containing a gas deliverable to the asset module;
- a heat exchanger configured to heat or cool the gas;
- a humidifier configured to apply moisture to the gas; and
- a pressure control valve configured to regulate pressure of the gas;
- wherein one or more of the discharge control valve and the inlet control valve are adjusted by the atmospheric control element based on the one or more parameters to control the atmosphere within the inner volume.

19. The system according to claim 18 further comprising:
- a supply header configured to deliver the gas through the inlet control valve to each of the two or more asset modules; and
- a discharge header configured to remove the gas through the discharge control valve from each of the two or more asset modules.

20. The system according to claim 19 further comprising:
- a pump in communication with the atmospheric control element, the pump connected directly to a discharge line, the discharge line connected to the discharge header.

* * * * *